(12) United States Patent
Mori

(10) Patent No.: US 7,775,473 B2
(45) Date of Patent: Aug. 17, 2010

(54) MOTORIZED RETRACTOR

(75) Inventor: Shinji Mori, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 843 days.

(21) Appl. No.: 11/515,936

(22) Filed: Sep. 6, 2006

(65) Prior Publication Data
US 2007/0051841 A1 Mar. 8, 2007

(30) Foreign Application Priority Data
Sep. 7, 2005 (JP) ............... 2005-259013
Nov. 30, 2005 (JP) ............... 2005-345621

(51) Int. Cl.
*B60R 22/46* (2006.01)
(52) U.S. Cl. .................... 242/374; 242/390.9
(58) Field of Classification Search .............. 242/374, 242/375.1, 375.3, 390.8, 390.9; 280/806, 280/807; 297/475–478
See application file for complete search history.

(56) References Cited
U.S. PATENT DOCUMENTS

| 4,655,312 A * | 4/1987 | Frantom et al. ............. 180/268 |
| 5,526,996 A * | 6/1996 | Ebner et al. ................. 242/374 |
| 5,730,384 A * | 3/1998 | Fohl ............................ 242/374 |
| RE36,190 E * | 4/1999 | Ono et al. .................... 242/374 |
| 6,427,935 B1* | 8/2002 | Fujii et al. ................ 242/390.9 |
| 2002/0166914 A1* | 11/2002 | Specht ....................... 242/374 |
| 2004/0075009 A1* | 4/2004 | Mori et al. ............... 242/390.8 |
| 2004/0108155 A1* | 6/2004 | Mori et al. .................. 180/268 |
| 2005/0082410 A1 | 4/2005 | Tanaka et al. |
| 2007/0296198 A1* | 12/2007 | Eberle et al. ................ 280/806 |

FOREIGN PATENT DOCUMENTS

| CN | 1579847 A | 2/2005 |
| JP | 2001-63522 | 3/2001 |
| JP | 2005-29014 | 2/2005 |
| WO | WO 2005039942 A1 * | 5/2005 |
| WO | WO 2005087553 A1 * | 9/2005 |

* cited by examiner

*Primary Examiner*—John Q Nguyen
*Assistant Examiner*—Scott Haugland
(74) *Attorney, Agent, or Firm*—Roberts Mlotkowski Safran & Cole, P.C.; Thomas W. Cole

(57) ABSTRACT

In a motorized retractor, due to an ECU and a driver switching a speed of rotation of an output shaft of a motor to a first speed or a second speed, a transfer path of rotational force from the motor to a spool is switched to a first driving force transferring section (a path through a meshing clutch and a slip mechanism) or a second driving force transferring section (a path through an overload mechanism and a centrifugal clutch). Accordingly, there is no need for a complex switching mechanism including a solenoid which is employed in conventional motorized retractors. A device can thereby be made more compact.

5 Claims, 16 Drawing Sheets

MOTORIZED RETRACTOR

CROSS-REFERENCE TO RELATED APPLICATION

This application claims priority under 35 USC 119 from Japanese Patent Applications Nos. 2005-259013 and 2005-345621, the disclosures of which are incorporated by reference herein.

BACKGROUND

1. Field of the Invention

The present invention relates to a motorized retractor which is applied to a seat belt device for restraining, by a webbing, the body of a vehicle occupant seated in a seat of a vehicle or the like, and which can take-up the webbing such that the webbing can be pulled-out.

2. Description of the Related Art

Seat belt devices, which restrain a vehicle occupant seated in a seat by an elongated, belt-shaped webbing, are mounted in vehicles such as passenger cars and the like. Among such seat belt devices, so-called three-point-type seat belt devices are provided with a retractor (webbing retractor) which accommodates the webbing in a state in which the webbing is taken-up such that it can be pulled-out.

The retractor has a spool, at which the longitudinal direction proximal end side of the webbing is anchored and which takes-up the webbing from the proximal end side by rotating, and an urging member, such as a spiral spring or the like which urges the spool in the direction of taking-up the webbing. In a seat belt device provided with this retractor, when the webbing is applied to a vehicle occupant, the spool is urged by the urging force of the urging member in the direction of taking-up the webbing. The webbing, from which slack has been removed, thereby restrains the vehicle occupant. Further, when the vehicle occupant cancels the state in which the webbing is applied to him/her, the webbing is taken-up onto the spool by the urging force of the urging member.

Here, if the urging force of the urging member is small, the webbing is in a slack state in which it is not completely taken-up, which is a cause of deterioration in appearance at times when the webbing is not in use. On the other hand, if the urging force of the urging member is large, it is a cause of imparting a constricting sensation to the occupant to which the webbing is applied.

Therefore, a motorized retractor (motorized seat belt retractor) having a mechanism which drives the spool by the driving force of a motor (a so-called "take-up assisting mechanism") has been conceived of in order to reduce the urging force of the urging member and mitigate (suppress) the constricting sensation imparted to the vehicle occupant, and in order to compensate for the reduction in the force taking-up the webbing onto the spool due to this reduction in urging force.

In a motorized retractor equipped with such a take-up assisting mechanism, in consideration of the comfort and the like for the vehicle occupant, it is preferable that the take-up torque of the spool by the driving force of the motor be set to be low to the extent of supplementing the urging force of the urging member. To this end, a reduction mechanism whose reduction ratio is set to be low is provided between the output shaft of the motor and the spool.

On the other hand, when the urging force of the urging member is decreased so as to mitigate the constricting sensation imparted to the vehicle occupant as described above, a slight amount of looseness known as "slack" arises at the webbing in its applied state, and is a cause of a deterioration in the restraining performance of the webbing at the time of a vehicle collision or the like.

Therefore, a motorized retractor has been conceived of which is equipped with a mechanism (a so-called "pretensioner mechanism") which improves the restraining performance of the webbing by forcibly rotating the spool in the take-up direction by the driving force of a motor when the risk of a collision is sensed.

In a motorized retractor equipped with such a pretensioner mechanism, the webbing must be forcibly taken-up against the inertial force of the vehicle occupant who starts to move toward the front of the vehicle due to sudden deceleration of the vehicle. Therefore, the take-up torque of the spool by the driving force of the motor must be set to be high. Thus, a reduction mechanism whose reduction ratio is set to be high is provided between the output shaft of the motor and the spool.

Further, a motorized retractor is known which provides both a take-up assisting mechanism and a pretensioner mechanism as described above by a single motor (see, for example, Japanese Patent Application Laid-Open (JP-A) No. 2001-63522).

In the motorized retractor disclosed in JP-A No. 2001-63522, two different reduction mechanisms, which can transfer the rotational force of an output shaft of a motor to a spool, are provided between the output shaft and the spool. These reduction mechanisms are set to different reduction ratios. When one of these reduction mechanisms is switched to by a switching mechanism which includes a solenoid, the rotational force of the output shaft is transferred to the spool via the reduction mechanism which has been switched to.

Accordingly, when the reduction mechanism whose reduction ratio is set to be low is switched to, the spool is rotated at high speed and low torque. When the reduction mechanism whose reduction ratio is set to be high is switched to, the spool is rotated at low speed and high torque. In this way, the mutually contradictory performances demanded of the take-up assisting mechanism and the pretensioner mechanism can both be achieved by a single motor.

However, in the motorized retractor of the above-described structure, because the switching mechanism is a complex structure including a solenoid as described above, space for placement of the solenoid must be ensured, which is a cause of the device becoming large.

SUMMARY OF THE INVENTION

In view of the aforementioned, the present invention provides a motorized retractor which can achieve both of the mutually contradictory performances required of a take-up assisting mechanism and a pretensioner mechanism by a single motor, and which does not require a switching mechanism so that the device can be made more compact.

A motorized retractor of an invention relating to a first aspect has: a spool on which a webbing for restraining a vehicle occupant is wound so as to be able to be taken-up thereon and pulled-out therefrom; a motor; a control section able to switch a speed of rotation of an output shaft of the motor to at least two levels which are a first speed and a second speed which is faster than the first speed; a first driving force transferring section provided between the spool and the output shaft, and reducing, at a predetermined reduction ratio, rotation of the output shaft at the first speed, and transferring it to the spool, and rotating the spool in a take-up direction; and a second driving force transferring section provided between the spool and the output shaft independently of the first driving force transferring section, and reducing, at a reduction ratio which is higher than the predetermined reduction ratio of the first driving force transferring section, rotation of the output shaft at the second speed, and transferring it to the spool, and rotating the spool in the take-up direction.

The motorized retractor of the first aspect has the motor, and the first driving force transferring section and the second driving force transferring section which transfer the rotational force of the output shaft of the motor to the spool. The rotational force of the output shaft of the motor can be transferred to the spool via two different transfer paths.

Namely, when the control section rotates the output shaft of the motor at the first speed, that rotation is reduced and transferred to the spool by the first driving force transferring section. The spool is thereby rotated in the take-up direction. In contrast, when the control section rotates the output shaft of the motor at the second speed which is faster then the first speed, that rotation is reduced and transferred to the spool by the second driving force transferring section. The spool is thereby rotated in the take-up direction.

Further, in this case, the reduction ratio of the second driving force transferring section is set to be higher than the reduction ratio of the first driving force transferring section. When the spool is rotated in the take-up direction via the second driving force transferring section, the spool is rotated at a low speed and a high torque. In contrast, when the spool is rotated in the take-up direction via the first driving force transferring section, the spool is rotated at a high speed and a low torque.

Accordingly, usually, at times such as when the vehicle occupant releases the application of the webbing, or the like, if the control section rotates the output shaft of the motor at the first speed, the spool is rotated in the take-up direction at a high speed and a low torque via the first driving force transferring section, and the webbing is taken-up onto the spool. In this way, for example, even in cases in which the urging force of an urging member which urges the spool in the take-up direction is reduced and the constricted sensation of the vehicle occupant when the webbing is applied is reduced, the decrease in the force of taking-up the webbing onto the spool due to this reduction in urging force can be compensated for by the driving force of the motor, and the webbing can be completely taken-up onto the spool and accommodated (a so-called "take-up assisting mechanism").

On the other hand, for example, at times when the risk of a vehicle collision is sensed or the like when the webbing is in an applied state, if the control section rotates the output shaft of the motor at the second speed, the spool is rotated in the take-up direction at a low speed and a high torque via the second driving force transferring section. In this way, the webbing can be forcibly taken-up onto the spool. Therefore, the slight looseness of the webbing (so-called "slack") in the applied state is eliminated, and the force of restraining the vehicle occupant by the webbing can be increased (a so-called "pretensioner mechanism").

In this way, in the motorized retractor of the first aspect, both of the mutually contradictory performances demanded of a take-up assisting mechanism and a pretensioner mechanism can be achieved by a single motor.

Further, in the motorized retractor of the first aspect, as described above, due to the control section switching the speed of rotation of the output shaft of the motor to the first speed or the second speed, the transfer path of the rotational force from the motor to the spool is switched to the first driving force transferring section or the second driving force transferring section. Accordingly, there is no need for a complex switching mechanism including a solenoid which is employed in conventional motorized retractors, and the device can thereby be made more compact.

In a motorized retractor of an invention relating to a second aspect, in the motorized retractor of the first aspect, the control section always rotates the output shaft in one direction when driving the motor, and the first driving force transferring section transfers the rotation of the output shaft to the spool when the output shaft rotates in the one direction at the first speed, and the second driving force transferring section transfers the rotation of the output shaft to the spool when the output shaft rotates in the one direction at the second speed.

In the motorized retractor of the second aspect, when the control section rotates the output shaft of the motor in one direction at the first speed, that rotation is transferred to the spool via the first driving force transferring section, and the spool is thereby rotated in the take-up direction. On the other hand, when the control section rotates the output shaft of the motor in one direction at the second speed, that rotation is transferred to the spool via the second driving force transferring section, and the spool is thereby rotated in the take-up direction.

In this way, the control section always rotates the output shaft of the motor in the one direction, but by switching the speed of the rotation of the output shaft to the first speed or the second speed, the transfer path of the rotational force from the motor to the spool is switched to the first driving force transferring section or the second driving force transferring section. Accordingly, control of the driving of the motor by the control section can be made to be simple.

In a motorized retractor of an invention relating to a third aspect, in the motorized retractor of the first or second aspect, the first driving force transferring section has: a first clutch which, when the output shaft of the motor rotates, connects the spool and the output shaft, and makes transfer of rotation between the spool and the output shaft possible; and a first idle running mechanism which, when torque which is greater than or equal to a first set value is applied to the spool in a connecting state of the first clutch, cuts-off the transfer of rotation between the spool and the output shaft by that torque, and makes the spool and the output shaft able to idly run relatively.

In the motorized retractor of the third aspect, when the control section rotates the output shaft of the motor at the first speed, the first clutch connects the spool and the output shaft. In this way, the rotation of the output shaft at the first speed is transferred to the spool, and the spool is rotated in the take-up direction.

In the above-described state in which the spool and the output shaft are connected by the first clutch (the state in which the webbing is taken-up on the spool), when torque which is greater than or equal to the first set value is applied to the spool (e.g., when a foreign object gets caught on the webbing, or the like), the first idle running mechanism cuts-off the transfer of rotation between the spool and the output shaft by that torque, and makes the both able to idly run relatively. In this way, it is possible to prevent the webbing from being forcibly taken-up onto the spool in a state in which the webbing interferes with a foreign object.

In a motorized retractor of an invention relating to a fourth aspect, in the motorized retractor of the third aspect, the first clutch is a meshing clutch having a pawl for forward rotation which rotates by rotation of the output shaft being transferred thereto, and when the output shaft rotates forward, the pawl for forward rotation transfers forward rotation of the output shaft to the spool by meshing one of directly and indirectly with the spool, and when the output shaft is stopped or rotates reversely, a meshed state of the pawl for forward rotation is cancelled; and the first idle running mechanism is a slip mechanism having a first slip member which rotates by rotation of the output shaft being transferred thereto, the first slip member being connected one of directly and indirectly to the spool by frictional force and making the spool able to rotate, and when torque which is greater than or equal to the first set value is applied to the spool, the first slip member slips with respect to the spool against the frictional force.

In the motorized retractor of the fourth aspect, when the output shaft of the motor rotates forward, the pawl for forward rotation of the meshing clutch directly or indirectly meshes with the spool. In this way, the rotation of the output shaft is transferred to the spool, the spool is rotated in the take-up direction, and the webbing is taken-up onto the spool.

Further, in the state in which the webbing is taken-up on the spool in this way, when, for example, the webbing gets caught on a foreign object and torque which is greater than or equal to the first set value is applied to the spool, the first slip member of the slip mechanism, which is connected directly or indirectly with respect to the spool by frictional force, slips with respect to the spool against the frictional force. In this way, the transfer of rotation between the spool and the output shaft is cut-off, and the spool and the output shaft idly run relatively.

On the other hand, when the output shaft of the motor is stopped or rotates backward, the state in which the pawl for forward rotation of the meshing clutch is meshed with the spool is cancelled, and the transfer of rotation from the output shaft to the spool is thereby cancelled.

In a motorized retractor of an invention relating to a fifth aspect, in the motorized retractor of the fourth aspect, the meshed state of the pawl for forward rotation of the meshing clutch is cancelled when the output shaft stops, and the meshing clutch has a pawl for reverse rotation which, by meshing one of directly and indirectly with the spool when the output shaft rotates reversely, transfers reverse rotation of the output shaft to the spool and rotates the spool in a pull-out direction, and whose meshed state is cancelled when the output shaft stops.

In the motorized retractor of the fifth aspect, when the output shaft of the motor rotates reversely, due to the pawl for reverse rotation of the meshing clutch meshing directly or indirectly with the spool, the rotation of the output shaft is transferred to the spool and the spool is rotated in the pull-out direction. Accordingly, if the output shaft of the motor is rotated reversely at the time when, for example, the vehicle occupant starts to pull-out the webbing which is accommodated in the present motorized retractor, the pulling-out of the webbing is assisted, and the vehicle occupant can pull-out the webbing with a slight force (a so-called "pull-out assisting mechanism"). Further, when the output shaft of the motor stops, the meshed-together state of the pawl for reverse rotation and the spool is cancelled.

In a motorized retractor of an invention relating to a sixth aspect, in the motorized retractor of the fourth aspect, the meshing clutch has: a drive gear connected to the output shaft of the motor, and rotating by rotation of the output shaft being transferred thereto, and rotatably supporting the pawl for forward rotation; a ratchet supported so as to rotate freely with respect to the drive gear, and connected to the first slip member; and a friction spring engaging one of directly and indirectly with a frame which supports the spool, the friction spring being connected to the pawl for forward rotation, the friction spring causing the pawl for forward rotation to mesh with the ratchet when the drive gear rotates in one direction as the output shaft rotates forward, and the friction spring causing the pawl for forward rotation to separate from the ratchet when the drive gear one of stops and rotates in another direction as the output shaft one of stops and rotates reversely, and the slip mechanism has a drum which is supported so as to rotate freely with respect to the ratchet and is connected to the spool, the drum making the spool able to rotate, and holding the first slip member by the frictional force.

In the motorized retractor of the sixth aspect, when the output shaft of the motor rotates forward, the drive gear which is connected to the output shaft rotates in one direction. When the drive gear rotates in one direction, the friction spring, which is engaged with the frame which supports the spool, causes the pawl for forward rotation, which is supported at the drive gear, to mesh with the ratchet. In this way, the drive gear and the ratchet are connected, and the ratchet rotates. The rotation of the ratchet is transferred to the drum via the first slip member, and the drum rotates. Because the drum is connected to the spool, the spool is rotated in the take-up direction via the drum. In this way, the webbing is taken-up onto the spool.

Further, in the state in which the webbing is taken-up on the spool in this way, when, for example, the webbing gets caught on a foreign object and torque which is greater than or equal to the first set value is applied to the spool, the first slip member, which is held at the drum by frictional force, slips with respect to the drum against the frictional force. The transfer of rotation between the drum (the spool) and the ratchet is thereby cut-off, and the both idly run relatively. In this way, it is possible to prevent the webbing from being forcibly taken-up onto the spool in a state in which the webbing interferes with a foreign object.

Moreover, when the drive gear stops or rotates in the other direction as the output shaft of the motor stops or rotates reversely, the friction spring which is engaged with the frame causes the pawl for forward rotation, which is supported at the drive gear, to separate from the ratchet. In this way, the state in which the drive gear and the ratchet are connected via the pawl for forward rotation is cancelled, and the transfer of rotation from the output shaft to the spool is cancelled.

In this aspect, it is possible that a gear is provided between the drive gear and the output shaft of the motor such that rotating of the output shaft is transferred to the drive gear.

In a motorized retractor of an invention relating to a seventh aspect, in the motorized retractor of the fifth aspect, the meshing clutch has: a drive gear connected to the output shaft of the motor, and rotating by rotation of the output shaft being transferred thereto, and rotatably supporting the pawl for forward rotation and the pawl for reverse rotation; a ratchet supported so as to rotate freely with respect to the drive gear, and connected to the first slip member; and an inertial member supported so as to be rotatable with respect to the drive gear, and held at a predetermined neutral position with respect to the drive gear by urging force applied to the inertial member, the inertial member causing the pawl for forward rotation to mesh with the ratchet by rotating relatively in another direction with respect to the drive gear against the urging force when the drive gear rotates in one direction as the output shaft rotates forward, and causing the pawl for reverse rotation to mesh with the ratchet by rotating relatively in one direction with respect to the drive gear against the urging force when the drive gear rotates in another direction as the output shaft rotates reversely, and the slip mechanism has a drum which is supported so as to rotate freely with respect to the ratchet and is connected to the spool, the drum making the spool able to rotate, and holding the first slip member by the frictional force.

In the motorized retractor of the seventh aspect, when the output shaft of the motor rotates forward, the drive gear which is connected to the output shaft rotates in one direction. When the drive gear rotates in one direction, the inertial member rotates in the other direction relative to the drive gear against the urging force, and causes the pawl for forward rotation to mesh with the ratchet. In this way, the drive gear and the ratchet are connected, and the ratchet rotates. The rotation of the ratchet is transferred to the drum via the first slip member, and the drum rotates. Because the drum is connected to the spool, the spool is rotated in the take-up direction via the drum. Further, when the output shaft of the motor stops, the inertial member is held at the neutral position by the urging force, and the meshed-together state of the pawl for forward rotation and the ratchet is cancelled.

On the other hand, when the output shaft of the motor rotates reversely, the drive gear, which is connected to the output shaft, rotates in the other direction. When the drive gear rotates in the other direction, the inertial member rotates relative to the drive gear in one direction against the urging force, and causes the pawl for reverse rotation to mesh with the ratchet. In this way, the drive gear and the ratchet are connected, and the ratchet rotates. The rotation of the ratchet is transferred to the drum via the first slip member, and the drum rotates. Because the drum is connected to the spool, the spool is rotated in the pull-out direction via the drum. Further, when the output shaft of the motor stops, the inertial member is held at the neutral position by the urging force, and the meshed-together state of the pawl for reverse rotation and the ratchet is cancelled.

Moreover, for example, in a state in which the rotational force of the output shaft is transferred to the spool via the drive gear, the pawl for forward rotation, the ratchet, the first slip member, and the drum, and the spool is rotated in the webbing take-up direction, when the webbing gets caught on a foreign object and torque which is greater than or equal to the first set value is applied to the spool, the first slip member, which is held at the drum by frictional force, slips with respect to the drum against the frictional force. The transfer of rotation between the drum (the spool) and the ratchet is thereby cut-off, and the both idly run relatively. In this way, it is possible to prevent the webbing from being forcibly taken-up onto the spool in a state in which the webbing interferes with a foreign object.

In a motorized retractor of an invention relating to an eighth aspect, in the motorized retractor of any one of the first through seventh aspects, the second driving force transferring section has a second clutch which, when the output shaft of the motor rotates at the second speed, connects the spool and the output shaft, and makes transfer of rotation between the spool and the output shaft possible.

In the motorized retractor of the eighth aspect, when the control section rotates the output shaft of the motor at the second speed, the second clutch connects the spool and the output shaft. In this way, the rotation of the output shaft at the second speed is transferred to the spool, and the spool is rotated in the take-up direction.

In a motorized retractor of an invention relating to a ninth aspect, in the motorized retractor of the eighth aspect, the second clutch is a centrifugal clutch having a weight which rotates by rotation of the output shaft being transferred thereto, and when the output shaft is rotating at greater than or equal to the second speed, the weight is moved due to centrifugal force applied thereto and engages one of directly and indirectly with the spool and connects the output shaft and the spool, and when the output shaft is one of stopped and rotating at less than the second speed, an engaged state of the weight with the spool is cancelled.

In the motorized retractor of the ninth aspect, when the output shaft of the motor is rotated at greater than or equal to the second speed, the weight of the centrifugal clutch is moved by the centrifugal force applied thereto, and engages directly or indirectly with the spool, and the output shaft and the spool are connected. In this way, the rotation of the output shaft is transferred to the spool, the spool is rotated in the take-up direction, and the webbing is taken-up onto the spool.

In a motorized retractor of an invention relating to a tenth aspect, in the motorized retractor of any one of the first through ninth aspects, the second driving force transferring section has a second idle running mechanism which, when torque which is greater than or equal to a second set value is applied to the spool in a state in which rotation of the output shaft is being transferred to the spool, cuts-off transfer of rotation between the spool and the output shaft by that torque, and makes the spool and the output shaft able to idly run relatively.

In the motorized retractor of the tenth aspect, in a state in which, for example, the rotational force of the output shaft is transferred to the spool via the second driving force transferring section and the spool is rotated in the take-up direction, when torque which is greater than or equal to the second set value is applied to the spool (e.g., when so-called "slack" is eliminated and the body of the vehicle occupant becomes "obstruction" and the webbing can basically not be taken-up any further, or the like), the second idle running mechanism cuts-off the transfer of rotation between the spool and the output shaft by that torque, and enables the both to idly run relatively. In this way, the spool can be prevented from being rotated in the take-up direction by a force which is greater than needed by the driving force of the motor, and the webbing can be prevented from tightly binding the body of the vehicle occupant by a force greater than needed.

In a motorized retractor of an invention relating to an eleventh aspect, in the motorized retractor of the tenth aspect, the second idle running mechanism is an overload mechanism having a second slip member which rotates by rotation of the output shaft being transferred thereto, and which is connected one of directly and indirectly with respect to the spool by frictional force, and which makes the spool able to rotate, and when torque which is greater than or equal to the second set value is applied to the spool, the second slip member slips with respect to the spool against the frictional force.

In the motorized retractor of the eleventh aspect, in the state in which, for example, the rotational force of the output shaft is transferred to the spool via the second driving force transferring section and the spool is rotated in the take-up direction, when torque which is greater than or equal to the second set value is applied to the spool (e.g., when so-called "slack" is eliminated and the body of the vehicle occupant becomes "obstruction" and the webbing can basically not be taken-up any further, or the like), the second slip member of the overload mechanism, which is directly or indirectly connected to the spool by frictional force, slips with respect to the spool against the frictional force. The transfer of rotation between the spool and the output shaft is thereby cut-off, and the spool and the output shaft idly run relatively. In this way, the spool can be prevented from being rotated in the take-up direction by a force which is greater than needed by the driving force of the motor, and the webbing can be prevented from tightly binding the body of the vehicle occupant by a force greater than needed.

In a motorized retractor of an invention relating to a twelfth aspect, in the motorized retractor of any one of the first through seventh aspects, the second driving force transferring section has: a second clutch which, when the output shaft of the motor rotates at the second speed, connects the spool and the output shaft, and makes transfer of rotation between the spool and the output shaft possible; and a second idle running mechanism which, when torque which is greater than or equal to a second set value is applied to the spool in a connecting state of the second clutch, cuts-off transfer of rotation between the spool and the output shaft by that torque, and makes the spool and the output shaft able to idly run relatively, and the second clutch is a centrifugal clutch having a weight which rotates by rotation of the output shaft being transferred thereto, and when the output shaft is rotating at greater than or equal to the second speed, the weight is moved due to centrifugal force applied thereto and engages one of directly and indirectly with the spool and connects the output shaft and the spool, and when the output shaft is one of stopped and rotating at less than the second speed, an engaged state of the weight with the spool is cancelled, and the second idle running mechanism is an overload mechanism having a second slip member which rotates by rotation of the output shaft being transferred thereto, and which is connected one of directly and indirectly with respect to the spool by frictional force, and which makes the spool able to rotate, and when torque which is greater than or equal to the second set value is applied to the spool, the second slip member slips with respect to the spool against the frictional force, and the overload mechanism has: an intermediate gear connected to the output shaft of the motor, and rotating by rotation of the output shaft being transferred thereto, the second slip member being anchored to the intermediate gear; and an adapter supported so as to be able to rotate relative to the intermediate gear, and holding the second slip member by the frictional force, and the centrifugal clutch has: a rotor connected to the adapter, and making the adapter able to rotate, and supporting the weight such that the weight is movable in a radial direction; an urging member urging the weight toward a radial direction inner side of the rotor; and a gear supported so as to rotate freely with respect to the rotor and the weight, and connected to the spool, and making the spool able to rotate, and being connected to the rotor via the weight due to the weight moving toward a radial direction outer side of the rotor by centrifugal force against urging force of the urging member when the rotor rotates as the output shaft rotates at greater than or equal to the second speed.

In the motorized retractor of the twelfth aspect, when the output shaft of the motor rotates at greater than or equal to the second speed, the intermediate gear which is connected to the output shaft rotates. The rotation of the intermediate gear is transferred to the adapter via the second slip member, and the adapter rotates, and the rotor which is connected to the adapter rotates. Therefore, centrifugal force is applied to the weight, which is supported so as to be movable in the radial direction with respect to the rotor, and the weight is moved toward the radial direction outer side of the rotor against the urging force of the urging member. When the weight is moved toward the radial direction outer side of the rotor, the gear, which is supported so as to rotate freely with respect to the rotor and the weight, is connected to the rotor via the weight. Therefore, the rotation of the rotor is transferred to the gear, and the gear rotates. Because the gear is connected to the spool, the spool is rotated in the take-up direction via the gear, and the webbing is thereby taken-up onto the spool.

Further, in a state in which, for example, the rotational force of the output shaft is transferred to the spool via the intermediate gear, the second slip member, the adapter, the rotor, the weight, and the gear, and the spool is rotated in the take-up direction, when torque which is greater than or equal to the second set value is applied to the spool (e.g., when so-called "slack" is eliminated and the body of the vehicle occupant becomes "obstruction" and the webbing can basically not be taken-up any further, or the like), the second slip member, which is held with respect to the adapter by frictional force, slips with respect to the adapter. The transfer of rotation between the intermediate gear (the output shaft) and the adapter is thereby cut-off, and the both idly run relatively. In this way, the spool, which is connected to the adapter via the rotor, the weight and the gear, can be prevented from being rotated in the take-up direction by a force which is greater than needed by the driving force of the motor, and the webbing can be prevented from tightly binding the body of the vehicle occupant by a force greater than needed.

On the other hand, when the output shaft stops or is rotating at less than the second speed, the weight of the centrifugal clutch is moved toward the radial direction inner side of the rotor by the urging force of the urging member, and the state in which the rotor and the gear are connected via the weight is cancelled. In this way, the transfer of rotation from the output shaft to the spool which is connected to the gear is cancelled.

As described above, in accordance with the motorized retractor of the present invention, both of the mutually contradictory performances required of a take-up assisting mechanism and a pretensioner mechanism can be achieved by a single motor, and no switching mechanism is needed so that the device can be made more compact.

BRIEF DESCRIPTION OF THE DRAWINGS

Embodiments of the invention will be described in detail with reference to the following figures, wherein.

DETAILED DESCRIPTION OF THE INVENTION

First Embodiment

Figure 1:
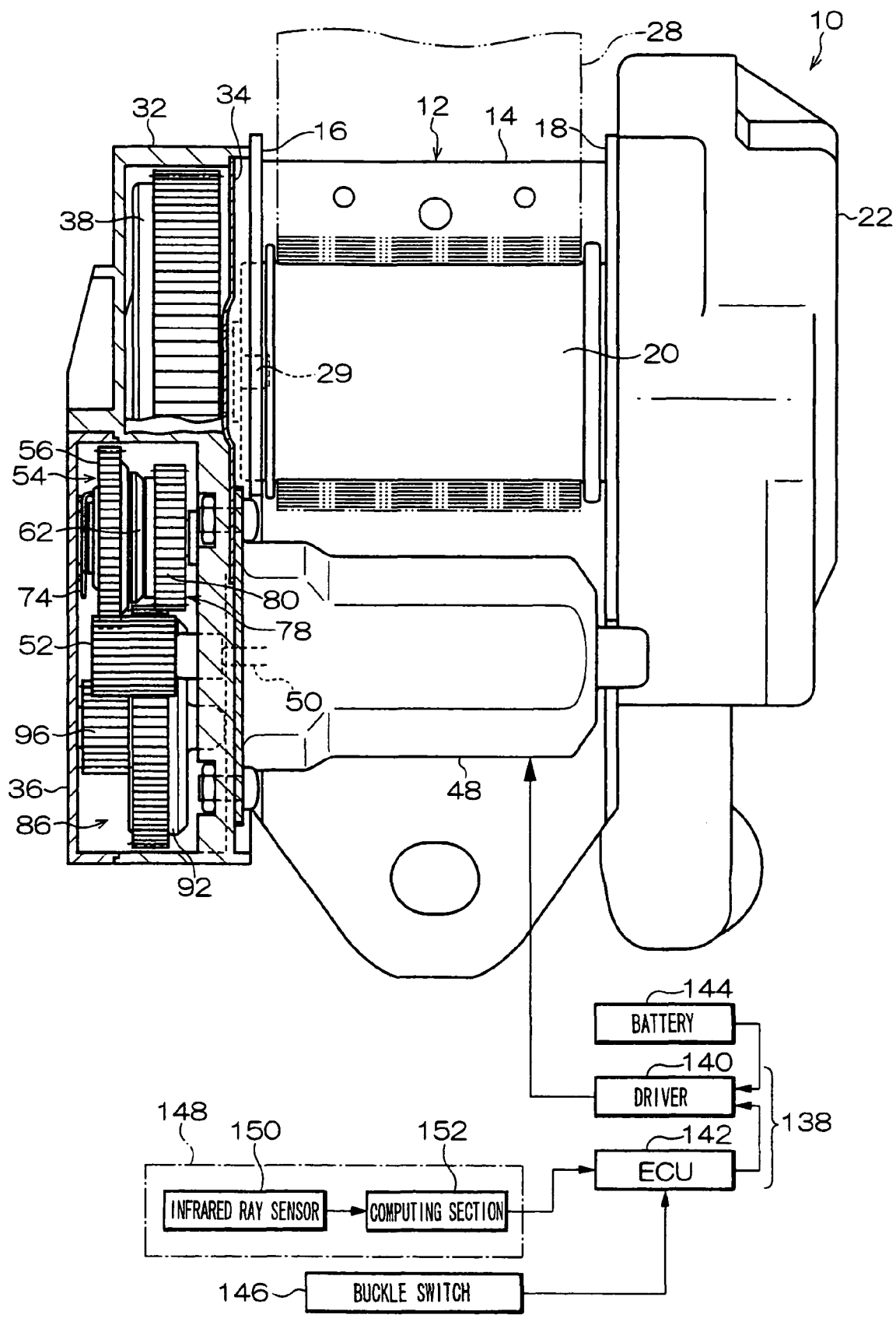
FIG. 1 is a schematic front view showing the overall structure of a motorized retractor relating to a first embodiment of the present invention.

A summary of the overall structure of a motorized retractor 10 relating to a first embodiment of the present invention is shown in front view in FIG. 1. Further, a summary of the overall structure of the motorized retractor 10 is shown in an exploded perspective view in FIG. 2. The structures of main portions of the motorized retractor 10 are shown in a sectional view in FIG. 3, and the structures of the main portions of the motorized retractor 10 are shown in an exploded perspective view in FIG. 4.

As shown in FIG. 1, the motorized retractor 10 is provided with a frame 12. The frame 12 has a substantially plate-shaped rear plate 14. Due to the rear plate 14 being fixed to a vehicle body by unillustrated fastening members such as bolts or the like, the motorized retractor 10 is fixed to the vehicle body. A pair of leg pieces 16, 18 are provided so as to extend from both transverse direction ends of the rear plate 14, in parallel with one another. A spool 20, which is manufactured by die-casting or the like, is rotatably disposed between the leg pieces 16, 18.

The proximal end portion of a webbing 28, which is formed in the shape of an elongated belt, is fixed to the spool 20. When the spool 20 is rotated in one direction around the axis thereof (hereinafter, this direction will be called the "take-up direction"), the webbing 28 is taken-up in layers from the proximal end side thereof onto the outer peripheral portion of the spool 20. Further, if the webbing 28 is pulled from the distal end side thereof, the webbing 28, which is taken-up on the outer peripheral portion of the spool 20, is pulled-out, and accompanying this, the spool 20 is rotated in the direction opposite the direction of rotation at the time of taking-up the webbing 28. (Hereinafter, the direction of rotation of the spool at the time when the webbing 28 is pulled-out will be called the "pull-out direction".)

A case 22 is fixed to the outer side of the frame, at the leg piece 18 side thereof. A lock mechanism and the like, which are not illustrated, are accommodated within the case 22. The lock mechanism usually permits free rotation of the spool 20 in the take-up direction and the pull-out direction, and impedes rotation of the spool 20 in the pull-out direction at the time of a rapid deceleration of the vehicle.

Figure 2:
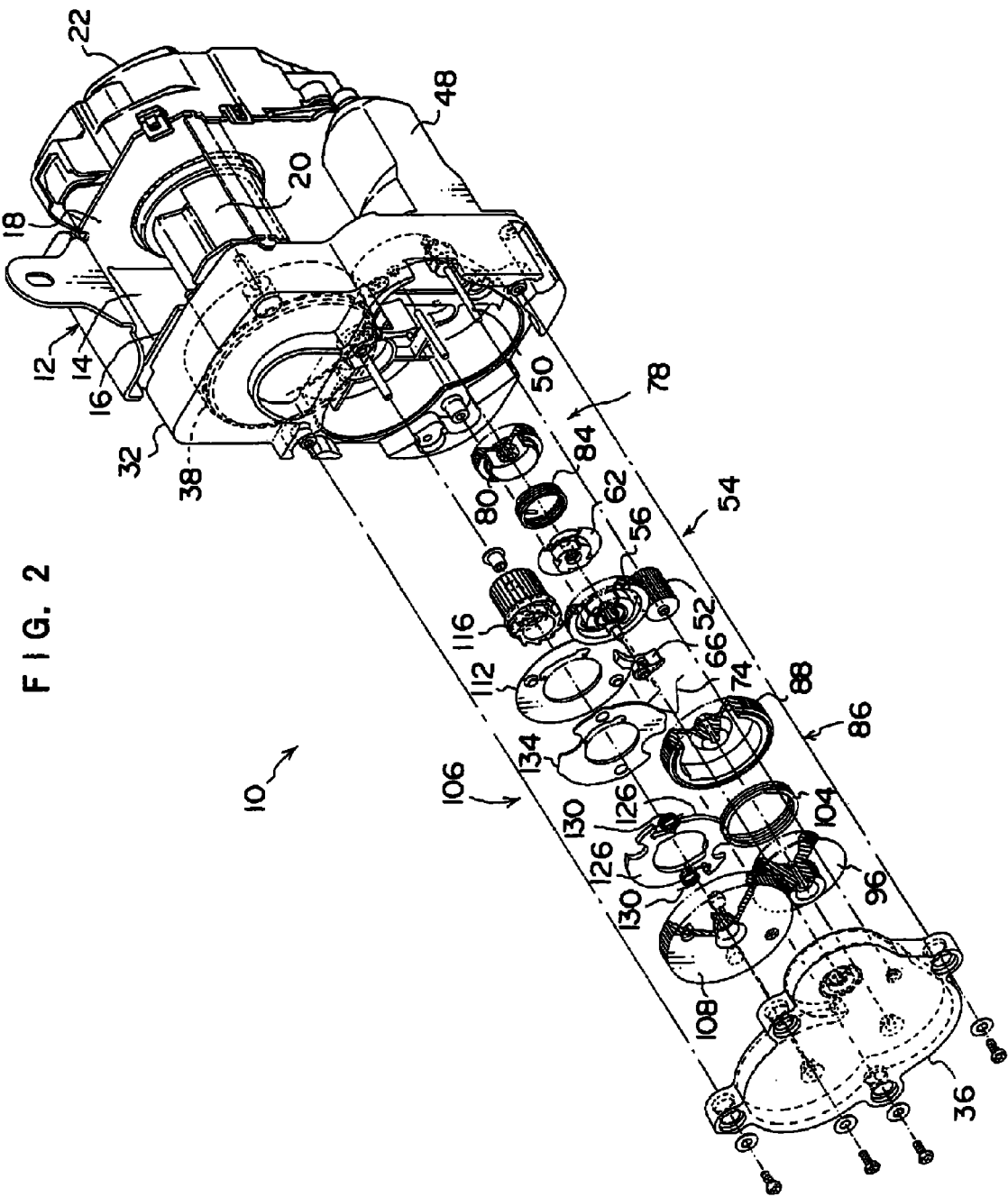
FIG. 2 is an exploded perspective view showing the overall structure of the motorized retractor relating to the first embodiment of the present invention.

The spool 20 has a connecting portion 29 which projects out coaxially from the leg piece 16 side end portion of the spool 20. The connecting portion 29 substantially coaxially passes through a round hole formed in the leg piece 16, and projects out to the exterior of the frame 12. A case 32 is fixed to the outer side of the frame 12 at the leg piece 16 side. An opening is formed in the case 32 at the frame 12 side. This opening is closed by a cover 34 which is screwed to the case 32. Further, as shown in FIG. 2 as well, an opening is formed in the case 32 at the side opposite the frame 12 as well, and this opening is closed by a cover 36 which is screwed to the case 32.

Figure 3:
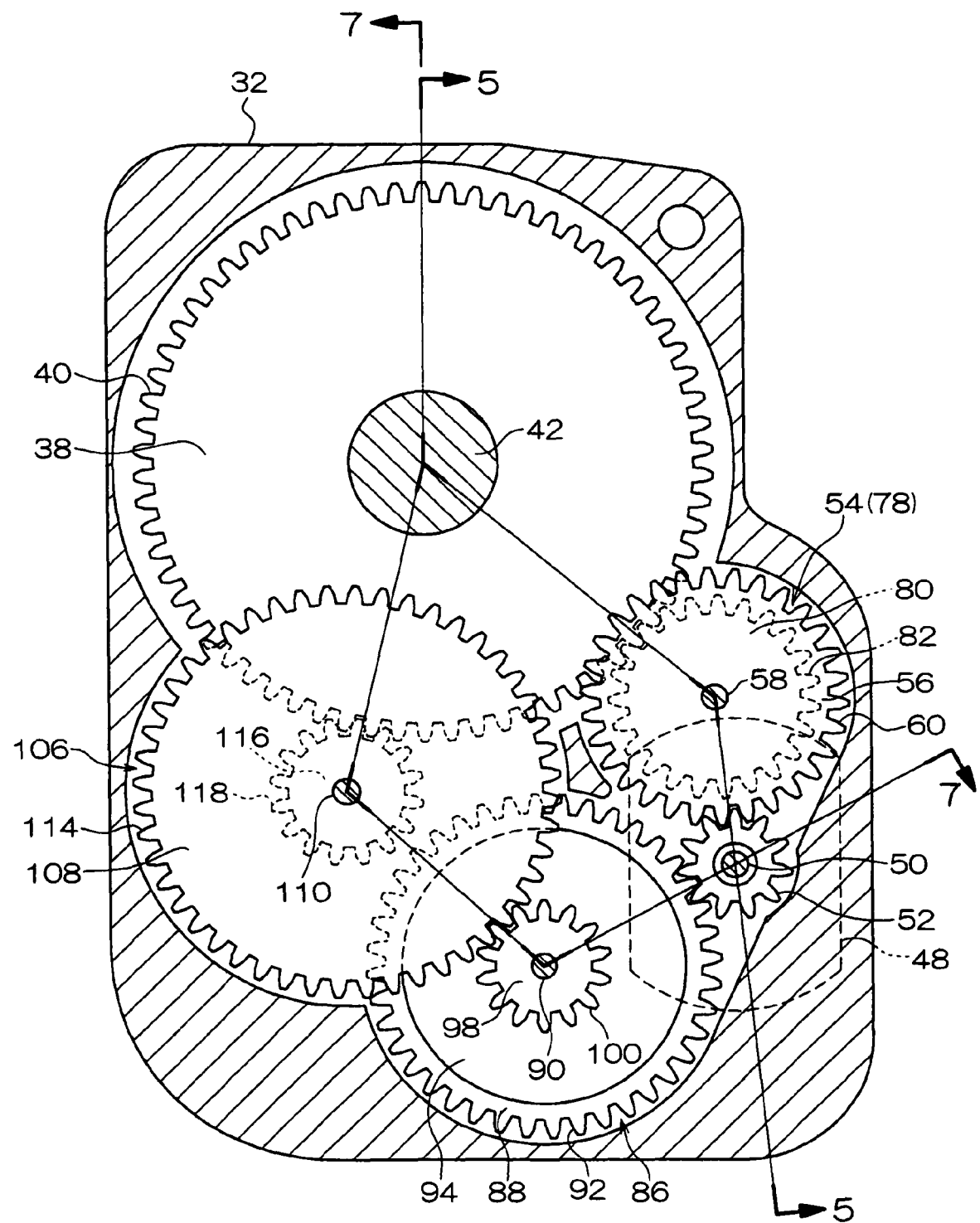
FIG. 3 is a side sectional view showing the structures of main portions of the motorized retractor relating to the first embodiment of the present invention.

As shown in FIG. 3, a barrel 38, which structures a first driving force transferring section and a second driving force transferring section, is accommodated within the case 32. The barrel 38 is formed in the shape of a cylindrical tube whose both axial direction end portions are closed. External teeth 40 are formed at the outer peripheral portion of the barrel 38. The external teeth 40 are a spur gear (a spur wheel).

Figure 5:
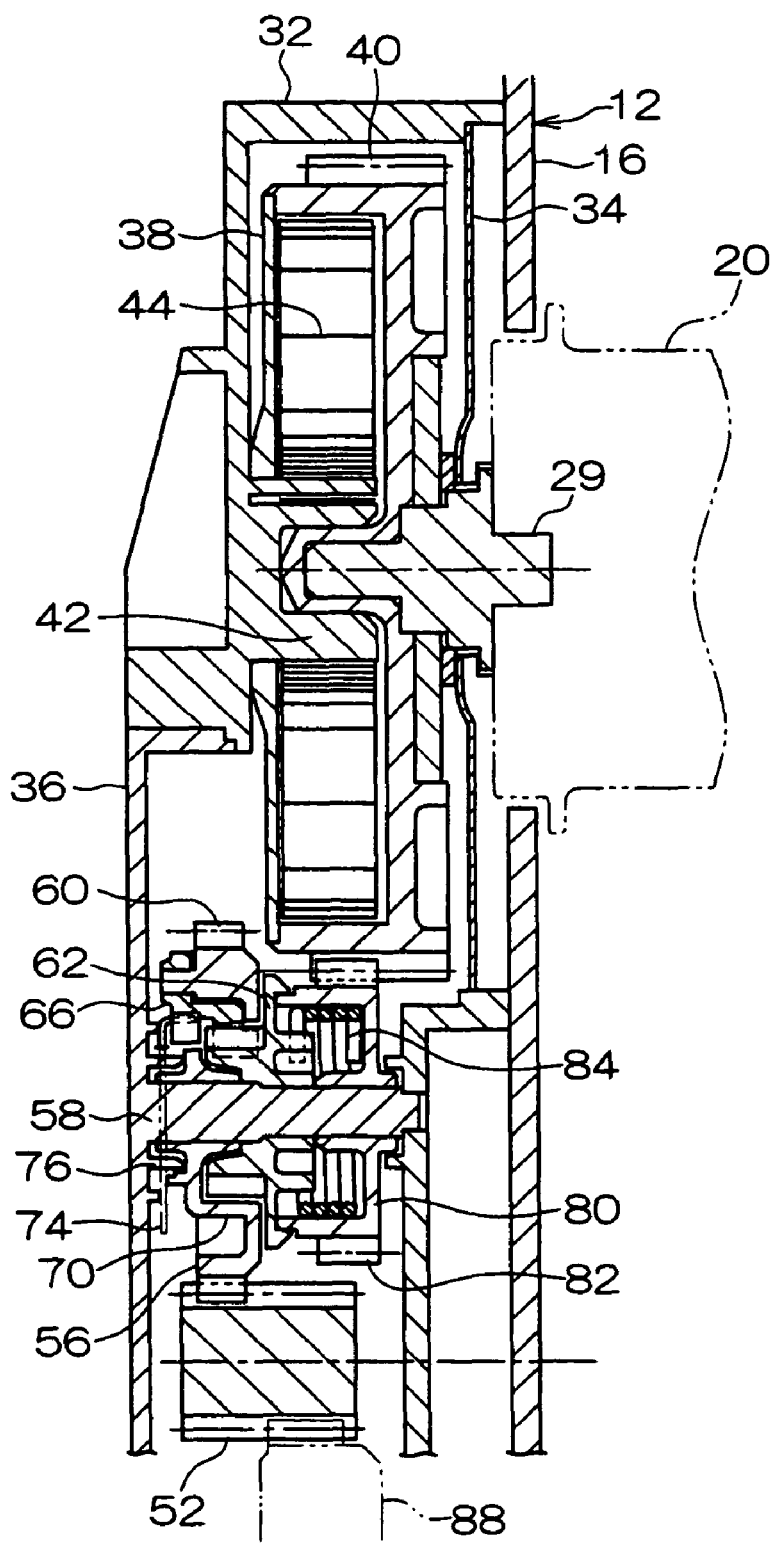
FIG. 5 is a sectional view taken along line 5-5 of FIG. 3, showing the structure of a first driving force transferring section of the motorized retractor relating to the first embodiment of the present invention.

As shown in FIG. 5, the barrel 38 is rotatably supported at a solid-cylindrical supporting portion 42 which is formed to project out at the side wall of the case 32. Further, the barrel 38 is connected coaxially and integrally with the connecting portion 29 of the spool 20 which passes through the round hole formed in the cover 34, and rotates integrally with the spool 20.

A spiral spring 44 is accommodated within the barrel 38. The inner end of the spiral spring 44 is anchored on the supporting portion 42 of the case 32, whereas the outer end is anchored on the barrel 38. The spiral spring 44 urges the spool 20 in the take-up direction via the barrel 38.

The (take-up force of the webbing 28 which is based on the) urging force of the spiral spring 44 is set to be relatively weak, to the extent of eliminating the slack of the webbing 28 applied to the vehicle occupant. In other words, the urging force of the spiral spring 44 is set to be a strength corresponding to the ability to not constrict the vehicle occupant in the state in which the webbing 28 is applied. Strength for completely taking-up, against frictional force and the like, the webbing 28 which is pulled-out from the spool 20 is not required of the spiral spring 44.

The motorized retractor 10 has a motor 48. The motor 48 is disposed downward of the spool 20 between the pair of leg pieces 16, 18, and is fixed to the side wall of the case 32. An output shaft 50 of the motor 48 passes through the side wall of the case 32 and is disposed within the case 32. A flat-toothed output gear 52 is mounted to the output shaft 50.

Figure 4:
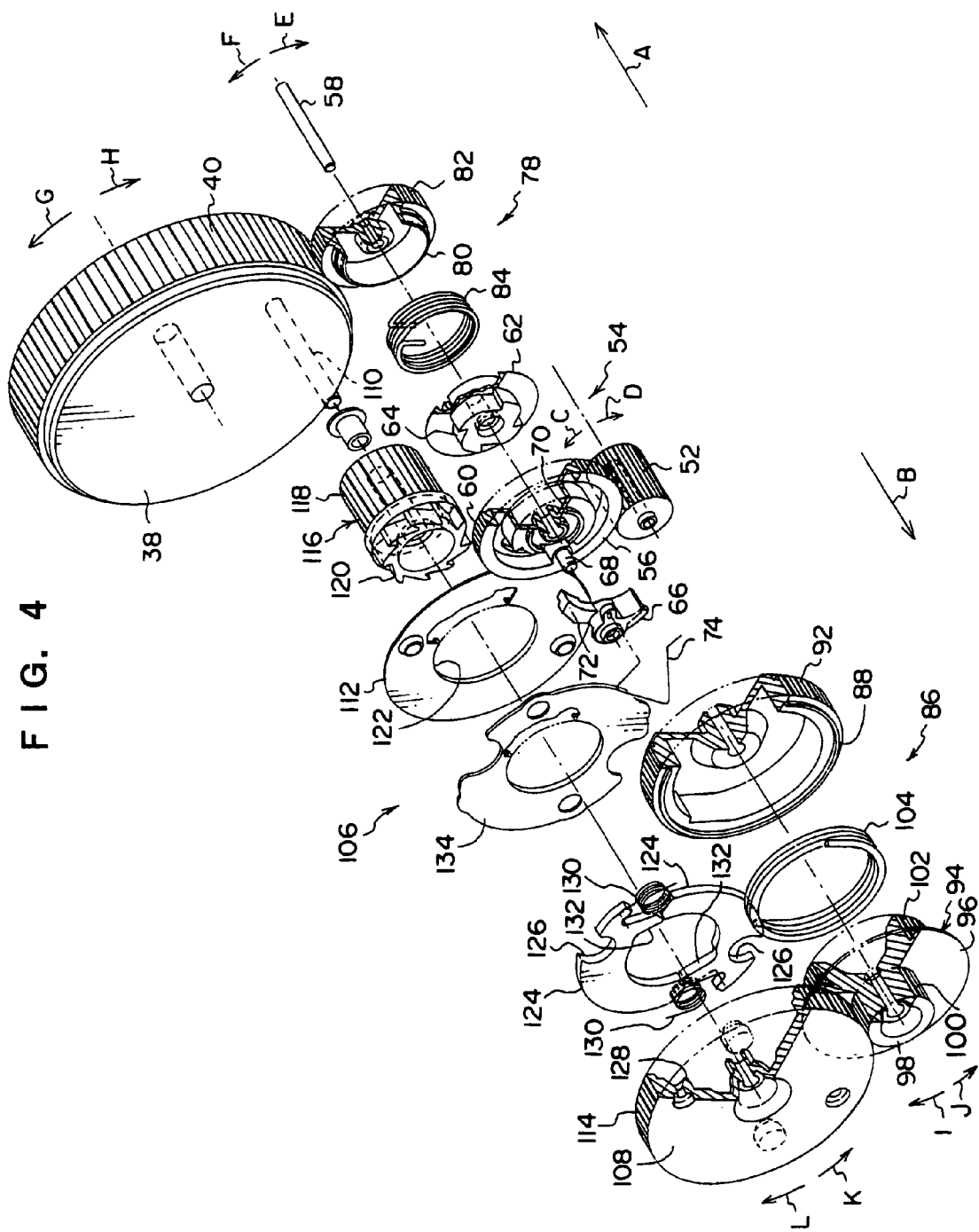
FIG. 4 is an exploded perspective view showing the structures of main portions of the motorized retractor relating to the first embodiment of the present invention.
Figure 6:
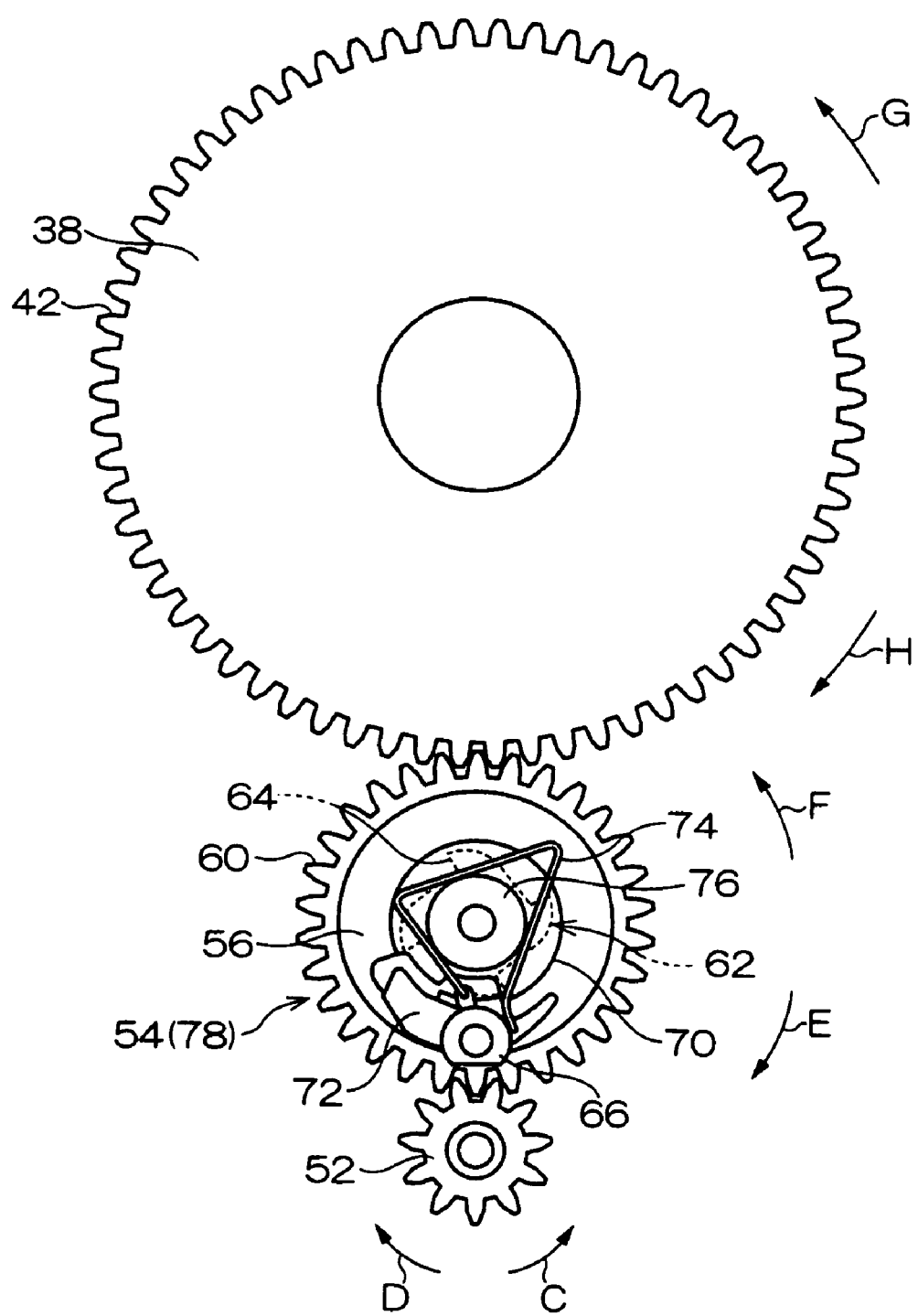
FIG. 6 is a development showing the structure of the first driving force transferring section of the motorized retractor relating to the first embodiment of the present invention.

A meshing clutch 54, which structures the first driving force transferring section, is provided within the case 32. As shown in FIGS. 4 through 6, the meshing clutch 54 has a drive gear 56. The drive gear 56 is supported at the case 32 so as to rotate freely, due to a supporting shaft 58, which is mounted to the case 32, passing through the axially central portion of the drive gear 56. Further, flat-toothed external teeth 60 are formed at the outer peripheral portion of the drive gear 56. These external teeth 60 mesh with the aforementioned output gear 52. Therefore, when the output gear 52 rotates in one direction (the direction of arrow C) around the axis thereof (i.e., when the output shaft 50 of the motor 48 rotates forward), the drive gear 56 rotates in one direction (the direction of arrow E) around the axis thereof. When the output gear 52 rotates in the other direction (the direction of arrow D) around the axis thereof (i.e., when the output shaft 50 of the motor 48 rotates reversely), the drive gear 56 rotates in the other direction (the direction of arrow F) around the axis thereof.

A ratchet 62, which is formed in the shape of a disc and which structures the meshing clutch 54, is provided at one axial direction side (the side in the direction of arrow A in FIG. 4) of the drive gear 56. Due to the supporting shaft 58 passing through the axially central portion of the ratchet 62, the ratchet 62 is supported at the case 32 so as to rotate freely, and can rotate relative to the drive gear 56. Ratchet teeth 64 are formed at the drive gear 56 side of the ratchet 62.

A pawl 66 for forward rotation, which structures the meshing clutch 54, is provided at the axial direction other side (the side in the direction of arrow B in FIG. 4) of the drive gear 56. The pawl 66 for forward rotation is rotatably supported at a supporting shaft 68 which projects-out at the other axial direction end portion of the drive gear 56. The pawl 66 for forward rotation has a meshing portion 72 which opposes a boss portion 70, which is formed coaxially at the axially central portion of the drive gear 56 and is shaped as a cylindrical tube having a floor. Due to the pawl 66 for forward rotation rotating around the supporting shaft 68, the meshing portion 72 approaches and moves away from the boss portion 70. A through hole is formed in the side wall of the boss portion 70 at a position opposing the meshing portion 72.

A friction spring 74, which is formed by bending a metal wire and which structures the meshing clutch 54, is provided at the axial direction other side (the arrow B direction side in FIG. 4) of the drive gear 56. Due to the friction spring 74 nipping, by its own elastic force, the outer periphery of a cylindrical-tube-shaped holding portion 76 (see FIG. 5) which projects-out at the cover 36, the friction spring 74 is held by frictional force with respect to the cover 36. One end portion of the friction spring 74 is anchored at the pawl 66 for forward rotation. Note that the holding portion 76 is formed coaxially with the supporting shaft 58.

When the drive gear 56 rotates in one direction (the direction of arrow E) around the axis thereof, the friction spring 74 rotates the meshing portion 72 of the pawl 66 for forward rotation toward the boss portion 70 of the drive gear 56. Therefore, the meshing portion 72 of the pawl 66 for forward rotation passes through the through hole formed in the boss portion 70, and meshes with the ratchet tooth 64 of the ratchet 62. In this way, the drive gear 56 and the ratchet 62 are connected integrally via the pawl 66 for forward rotation, and the ratchet 62 rotates in one direction (the direction of arrow E) around the axis thereof, integrally with the drive gear 56 and the pawl 66 for forward rotation.

Further, when the drive gear 56 rotates in the other direction (the direction of arrow F) around the axis thereof, the friction spring 74 rotates the meshing portion 72 of the pawl 66 for forward rotation toward the side opposite the boss portion 70 of the drive gear 56. Therefore, the meshing portion 72 of the pawl 66 for forward rotation moves away from the ratchet teeth 64 of the ratchet 62, and the connected state of the drive gear 56 and the ratchet 62 via the pawl 66 for forward rotation is cancelled. In this way, the drive gear 56 and the ratchet 62 relatively run idly.

A drum 80, which is formed in the shape of a cylindrical tube having a floor and which structures a slip mechanism 78, is provided at one axial direction side (the arrow A direction side in FIG. 4) of the ratchet 62. Due to the supporting shaft 58 passing through the axially central portion of the drum 80, the drum 80 is supported at the case 32 so as to rotate freely, and can rotate relative to the ratchet 62. Further, flat-toothed external teeth 82 are formed at the outer peripheral portion of the drum 80. The external teeth 82 mesh with the external teeth 40 of the barrel 38. When the drum 80 rotates in one direction (the direction of arrow E) around the axis thereof, the barrel 38 rotates in the take-up direction (the direction of arrow G). When the drum 80 rotates in the other direction (the direction of arrow F) around the axis thereof, the barrel 38 rotates in the pull-out direction (the direction of arrow H).

A first clutch spring 84, which is formed in a helical shape from a metal wire and structures the slip mechanism 78 and serves as a first slip member, is provided at the inner side of the drum 80. The outer diameter of the first clutch spring 84 is formed to be slightly larger than the inner diameter of the drum 80. By its own elastic force, the first clutch spring 84 causes its own outer peripheral portion to fit closely to the inner peripheral surface of the drum 80. Therefore, the first clutch spring 84 is connected (held) with respect to the drum 80 by frictional force, and basically rotates integrally with the drum 80.

The take-up direction one end portion of the first clutch spring 84 is anchored on the ratchet 62. Therefore, the ratchet 62 and the drum 80 are connected via the first clutch spring 84, and when the ratchet 62 rotates, the first clutch spring 84 and the drum 80 rotate. However, as described above, the first clutch spring 84 is a structure which is held with respect to the drum 80 by frictional force. Therefore, when relative rotational force which exceeds this frictional force is applied between the ratchet 62 and the drum 80, the first clutch spring 84 slips with respect to the drum 80. In this way, on the one hand, the ratchet 62 and the first clutch spring 84, and, on the other hand, the drum 80, relatively run idly.

Figure 7:
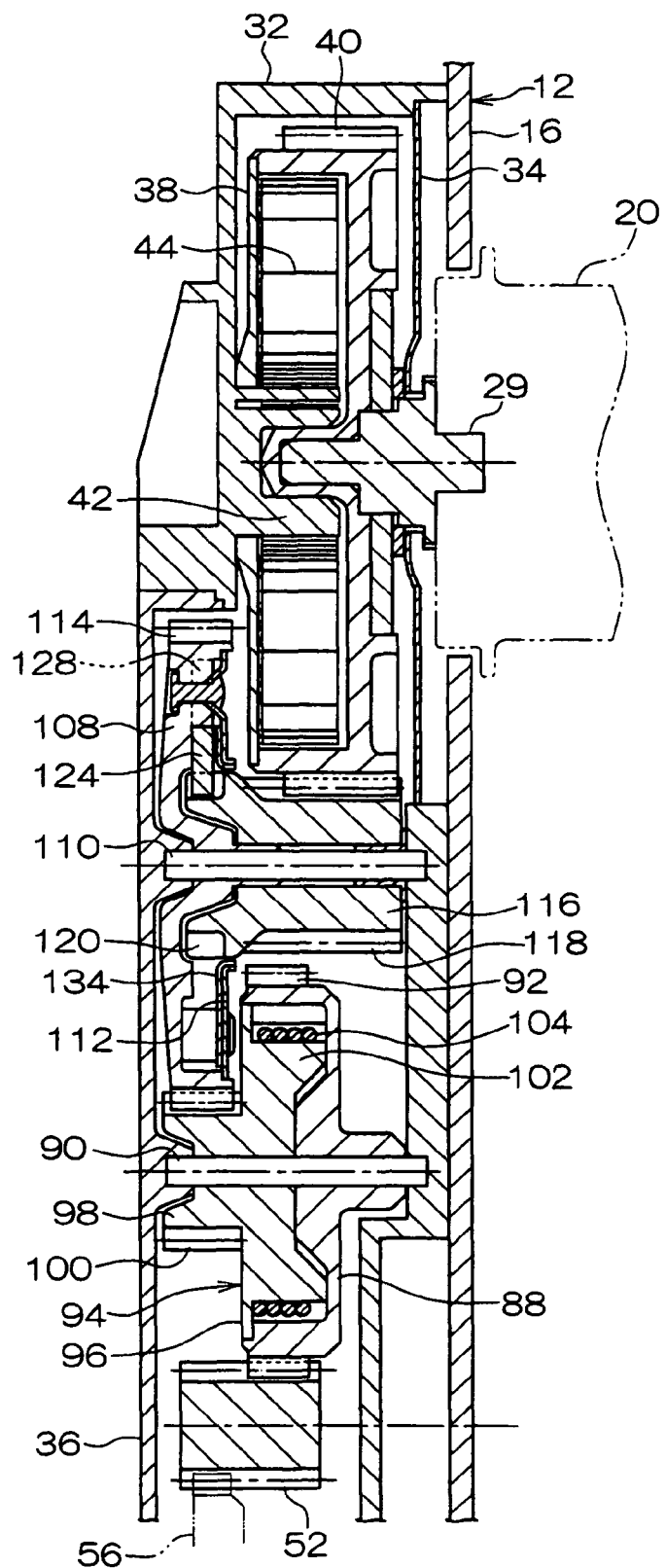
FIG. 7 is a sectional view taken along line 7-7 of FIG. 3, showing the structure of a second driving force transferring section of the motorized retractor relating to the first embodiment of the present invention.
Figure 8:
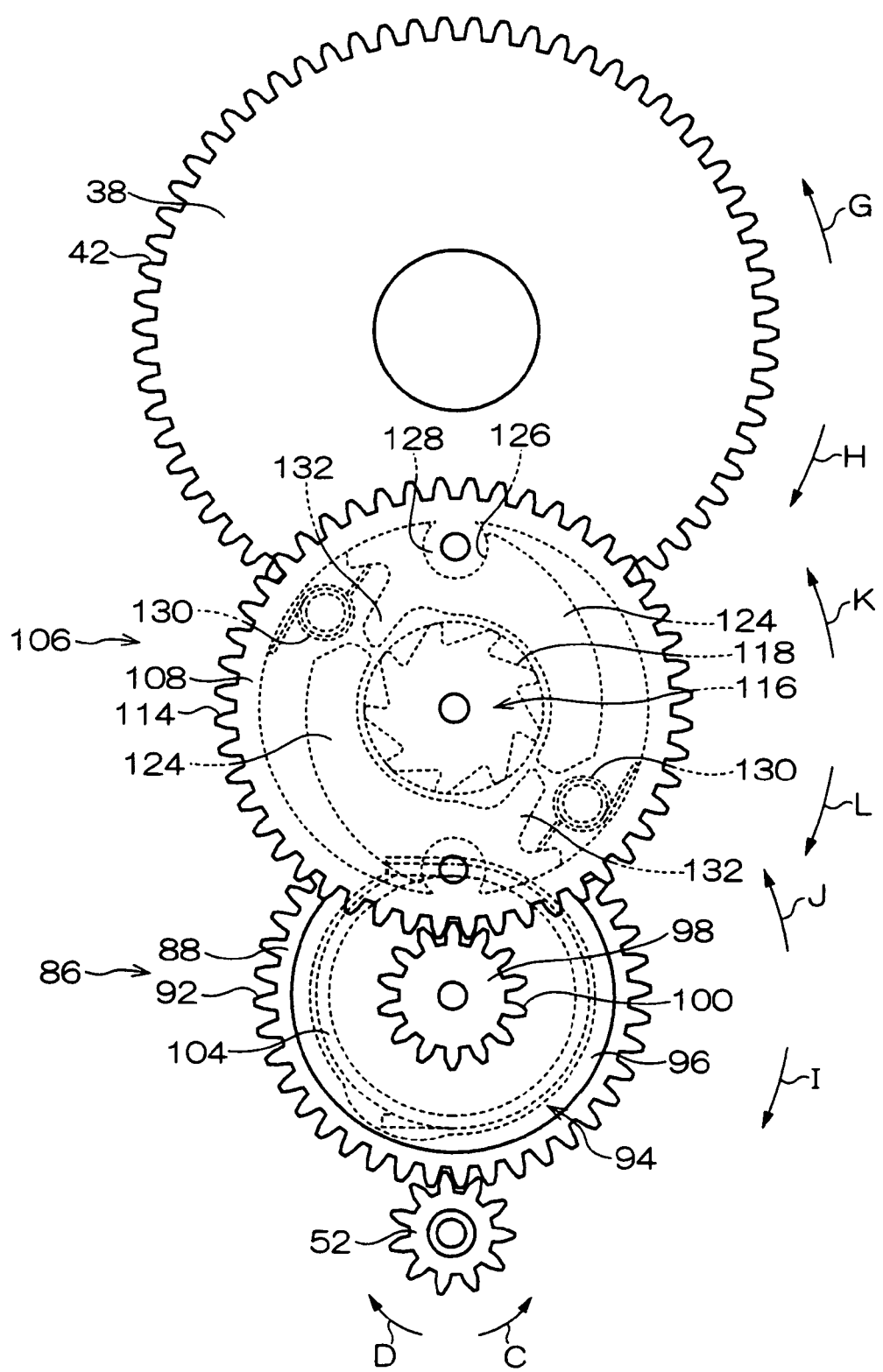
FIG. 8 is a development showing the structure of the second driving force transferring section of the motorized retractor relating to the first embodiment of the present invention.

The present motorized retractor 10 has an overload mechanism 86 structuring a second driving force transferring section. As shown in FIGS. 4, 7, and 8, the overload mechanism 86 has an intermediate gear 88 which is formed in the shape of a cylindrical tube having a floor. The intermediate gear 88 is supported at the case 32 so as to rotate freely due to a supporting shaft 90 (see FIG. 7), which is mounted to the case 32, passing through the axially central portion of the intermediate gear 88. Further, flat-toothed external teeth 92 are formed at the outer peripheral portion of the intermediate gear 88. The external teeth 92 mesh with the aforementioned output gear 52. Therefore, when the output gear 52 rotates in one direction (the direction of arrow C) around the axis thereof (i.e., when the output shaft 50 of the motor 48 rotates forward), the intermediate gear 88 rotates in one direction (the direction of arrow I) around the axis thereof. When the output gear 52 rotates in the other direction (the direction of arrow D) around the axis thereof (i.e., when the output shaft 50 of the motor 48 rotates reversely), the intermediate gear 88 rotates in the other direction (the direction of arrow J) around the axis thereof.

An adapter 94 which structures the overload mechanism 86 is provided at one axial direction side (the arrow A direction side in FIG. 4) of the intermediate gear 88. The adapter 94 has a flange portion 96 which is formed in the shape of a disc and freely-rotatably fits-together with an opening of the intermediate gear 88. A gear portion 98, which is formed in the shape of a solid cylinder, is formed so as to project coaxially at one axial direction side (the arrow B direction side in FIG. 4) of the flange portion 96. Flat-toothed external teeth 100 are formed at the outer periphery of the gear portion 98. Further, a holding portion 102, which is formed in the shape of a solid cylinder and which is accommodated at the inner side of the intermediate gear 88, is formed to project coaxially at the axial direction other side (the arrow A direction side in FIG. 4) of the flange portion 96.

An annular gap is formed between the outer peripheral surface of the holding portion 102 and the inner peripheral surface of the intermediate gear 88. A second clutch spring 104, which is formed in a helical shape from a metal wire and structures the overload mechanism 86 and serves as a second slip member, is accommodated in this gap. The inner diameter of the second clutch spring 104 is formed to be slightly smaller than the outer diameter of the holding portion 102. By its own elastic force, the second clutch spring 104 causes its own inner peripheral portion to fit closely to the outer peripheral surface of the holding portion 102, and the second clutch spring 104 is thereby connected (held) to the holding portion 102 by frictional force. Therefore, the second clutch spring 104 basically rotates integrally with the intermediate gear 88.

The take-up direction both end portions of the second clutch spring 104 interfere with the intermediate gear 88, such that relative rotation with respect to the intermediate gear 88 is restricted. Therefore, the intermediate gear 88 and the adapter 94 are connected via the second clutch spring 104, and when the intermediate gear 88 rotates, the second clutch spring 104 and the adapter 94 rotate. However, as described above, the second clutch spring 104 is a structure which is held with respect to the adapter 94 by frictional force. Therefore, when relative rotational force which exceeds this frictional force is applied between the intermediate gear 88 and the adapter 94, the second clutch spring 104 slips with respect to the adapter 94. In this way, on the one hand, the intermediate gear 88 and the second clutch spring 104, and, on the other hand, the adapter 94, relatively run idly.

The present motorized retractor 10 further has a centrifugal clutch 106 which structures the second driving force transferring section. The centrifugal clutch 106 has a rotor 108 which is formed in the shape of a cylindrical tube having a floor. The rotor 108 is supported at the case 32 so as to rotate freely due to a supporting shaft 110, which is mounted to the case 32, passing through the axially central portion of the floor wall of the rotor 108. A cover 112, which is formed from a metal plate material and in the shape of a disc, is mounted by screws to an opening of the rotor 108. Flat-toothed external teeth 114 are formed at the outer peripheral portion of the rotor 108. These external teeth 114 mesh with the aforementioned external teeth 100 of the gear portion 98 of the adapter 94. Therefore, when the adapter 94 rotates in one direction (the direction of arrow I) around the axis thereof, the rotor 108 rotates in one direction (the direction of arrow K) around the axis thereof. When the adapter 94 rotates in the other direction (the direction of arrow J) around the axis thereof, the rotor 108 rotates in the other direction (the direction of arrow L) around the axis thereof.

A gear 116, which is formed in the shape of a solid cylinder and which structures the centrifugal clutch 106, is provided at one axial direction side (the side in the direction of arrow A in FIG. 4) of the rotor 108. Due to the supporting shaft 110 passing through the axially central portion of the gear 116, the gear 116 is supported at the case 32 so as to rotate freely, and can rotate relative to the rotor 108. Flat-toothed external teeth 118 are formed at the outer peripheral portion of one axial direction end side (the arrow A direction side in FIG. 4) of the gear 116. These external teeth 118 mesh with the aforementioned external teeth 40 of the barrel 38. Therefore, when the gear 116 rotates in one direction (the direction of arrow K) around the axis thereof, the barrel 38 rotates in the pull-out direction (the direction of arrow H). When the gear 116 rotates in the other direction (the direction of arrow L) around the axis thereof, the barrel 38 rotates in the take-up direction (the direction of arrow G).

Ratchet teeth 120 are formed at the outer peripheral portion of the axial direction other end side (the arrow B direction side in FIG. 4) of the gear 116. These ratchet teeth 120 are disposed at the inner side of the rotor 108, via a round hole 122 which is formed in the axially central portion of the cover 112.

A pair of weights 124, which structure the centrifugal clutch 106 and which are each formed in the shape of a substantially semicircular plate of a metal material such as iron or the like, are disposed at the inner side of the rotor 108. The pair of weights 124 are formed to be the same weight, and are disposed at opposite sides of one another (sides 180° opposite one another) along the peripheral direction of the rotor 108. A shaft-receiving hole 126 which is circular is formed in a peripheral direction one end portion of each of the weights 124. Solid-cylindrical shaft portions 128 (see FIG. 8), which project out from the floor wall of the rotor 108, freely-rotatably fit-together with these shaft-receiving holes 126. In this way, the pair of weights 124 are supported at the rotor 108 so as to be able to rotate in the radial direction of the rotor 108 around the shaft portions 128 respectively.

The pair of weights 124 are urged toward the radial direction inner side of the rotor 108 and are usually held at the radial direction side of the rotor 108, by a pair of torsion coil springs 130 which are mounted to the floor wall of the rotor 108. Further, meshing projections 132 are formed at the pair of weights 124 at positions opposing the ratchet teeth 120 of the aforementioned gear 116. In the state in which the pair of weights 124 are held at the radial direction inner side of the rotor 108, these meshing projections 132 are apart from the ratchet teeth 120.

Note that a sheet 134, which is formed in the shape of a ring by a plate formed from a resin material, is disposed between the pair of weights 124 and the cover 112. The pair of weights 124 and the cover 112 are prevented from directly rubbing against one another.

Here, when the rotor 108 rotates in the other direction (the direction of arrow L) around the axis thereof, the pair of weights 124 supported at the rotor 108 rotate around the axis of the rotor 108 following the rotor 108. At this time, centrifugal force is applied to the pair of weights 124. Accordingly, when the centrifugal force applied to the pair of weights 124 becomes greater than or equal to a predetermined value (i.e., when the rotational speed of the rotor 108 becomes greater than or equal to a predetermined value), the pair of weights 124 rotate toward the radial direction outer side of the rotor 108 against the urging forces of the pair of torsion coil springs 130. When the pair of weights 124 rotate toward the radial direction outer side of the rotor 108 in this way, the pair of meshing projections 132 provided at the pair of weights 124 mesh with the ratchet teeth 120 of the gear 116. In the state in which the pair of meshing projections 132 are meshed with the ratchet teeth 120, the rotor 108 and the gear 116 are connected integrally via the pair of weights 124, and the rotor 108, the pair of weights 124, and the gear 116 rotate integrally.

When the centrifugal force applied to the pair of weights 124 becomes less than the predetermined value (i.e., when the rotational speed of the rotor 108 becomes less than the predetermined value), the pair of weights 124 are rotated toward the radial direction inner side of the rotor 108 by the urging forces of the pair of torsion coil springs 130, and the meshed-together state of the pair of meshing projections 132 and the ratchet teeth 120 of the gear 116 is cancelled. In this state, relative idle running between the rotor 108 and the gear 116 is possible.

Here, in the present motorized retractor 10, the reduction ratio due to the output gear 52, the external teeth 60 of the drive gear 56, the external teeth 82 of the drum 80, and the external teeth 40 of the barrel 38 (the first driving force transferring section), is set to be sufficiently lower than the total reduction ratio due to the output gear 52, the external teeth 92 of the intermediate gear 88, the external teeth 100 of the gear portion 98 of the adapter 94, the external teeth 114 of the rotor 108, the external teeth 118 of the gear 116, and the external teeth 40 of the barrel 38 (the second driving force transferring section).

On the other hand, as shown in FIG. 1, at the present motorized retractor 10, the control of the supply of electricity to the motor 48 is carried out by a control device 138. The control device 138 is structured from a driver 140 and an ECU 142. The motor 48 is electrically connected via the driver 140 to a battery 144 installed in the vehicle, and current from the battery 144 is supplied to the motor 48 via the driver 140. The driver 140 is connected to the ECU 142. The presence/absence of supplying of electricity to the motor 48 via the driver 140, the direction of the supplied current, and the magnitude thereof are controlled by the ECU 142.

The ECU 142 is connected to a buckle switch 146 which outputs a signal corresponding to the presence/absence of the application of the webbing 28 to a vehicle occupant, and to a forward monitoring device 148 which outputs a signal in accordance with the distance between the vehicle and an obstacle in front of the vehicle.

When a tongue plate provided at the webbing 28 is connected to a buckle device (neither the tongue plate nor the buckle device are shown), the buckle switch 146 outputs an ON signal to the ECU 142. When the state in which the tongue plate is connected to the buckle device is cancelled, the buckle switch 146 outputs an OFF signal to the ECU 142. Namely, the buckle switch 146 outputs to the ECU 142 one of the aforementioned ON signal and OFF signal, in accordance with the presence/absence of connection of the tongue plate and the buckle device which corresponds to the presence/absence of application of the webbing 28 by a vehicle occupant.

The forward monitoring device 148 has an infrared ray sensor 150 provided in a vicinity of the front end portion of the vehicle. The infrared ray sensor 150 emits infrared rays in front of the vehicle, and receives the infrared rays which are reflected back from another vehicle or an obstacle which is traveling or which is stopped in front of the vehicle. (Hereinafter, for convenience, "obstacle" will also include another vehicle which is traveling or which is stopped.)

The forward monitoring device 148 also has a computing section 152. The computing section 152 computes the distance to the obstacle on the basis of the period of time needed from the time that the infrared rays are emitted from the infrared ray sensor 150 to the time when they are reflected by the object and return to the infrared ray sensor 150. On the basis of the results of computation, the computing section 152 outputs an obstacle detection signal Os to the ECU 142. The obstacle detection signal Os is low level if the distance to an obstacle is greater than or equal to a predetermined value, and is high level if the distance to an obstacle is less than the predetermined value.

Here, at the present motorized retractor 10, the ECU 142 and the driver 140 are structured so as to be able to switch the speed of rotation of the output shaft 50 of the motor 48 between two levels which are a first speed and a second speed which is faster than the first speed.

Specifically, when the signal inputted from the buckle switch 146 changes from the ON signal to the OFF signal, the ECU 142 outputs to the driver 140 a control signal to start the supply of electricity to the motor 48. The driver 140 to which the control signal is inputted supplies current F having a current value I1 from the battery to the motor 48. In this case, the output shaft 50 (output gear 52) of the motor 48 rotates in the forward direction (the direction of arrow C) at the first speed.

Further, at the present motorized retractor 10, when the obstacle detection signal Os inputted from the computing section 152 changes from low level to high level, the ECU 142 outputs to the driver 140 an operation signal to start the supply of electricity to the motor 48. The driver 140 to which the operation signal is inputted supplies current R of a current value I2 from the battery to the motor 48. In this case, the current value I2 of the current R is set to be larger than the current value I1 of the current F, and the direction of the current R is set to be the opposite direction of the direction of the current F. Accordingly, in this case, the output shaft 50 (output gear 52) of the motor 48 rotates in the reverse direction (the direction of arrow D) at the second speed which is faster than the first speed.

Operation of the present first embodiment will be described next.

In the motorized retractor 10 having the above-described structure, in an accommodated state in which the webbing 28 is taken-up in layers on the spool 20, when the webbing 28 is pulled while the unillustrated tongue plate is pulled, the webbing 28 is pulled-out while the spool 20 is rotated in the pull-out direction against the urging force of the spiral spring 44 which urges the spool 20 in the take-up direction.

In this way, in the state in which the webbing 28 is pulled-out, the tongue plate is inserted into the buckle device while the webbing 28 is placed around the front of the body of the vehicle occupant seated on the seat, and the tongue plate is held at the buckle device. The webbing 28 is thereby set in a state of being applied to the body of the vehicle occupant.

In the state in which the vehicle occupant has applied the webbing 28 in this way, the webbing 28 restrains the vehicle occupant relatively weakly by the urging force of the spiral spring 44. Further, in this state, the ON signal from the buckle switch 146 is inputted to the ECU 142.

On the other hand, when the vehicle occupant stops the vehicle and removes the tongue plate from the buckle device, the spool 20 rotates in the take-up direction by the urging force of the spiral spring 44. However, because the urging force of the spiral spring 44 is set to be relatively weak, the spool 20 rotates in the take-up direction at a relatively weak rotational force corresponding to the urging force of the spiral spring 44.

Further, at this time, the OFF signal is inputted from the buckle switch 146 to the ECU 142. The ECU 142 to which the OFF signal is inputted outputs to the driver 140 the control signal for starting the supply of electricity to the motor 48. The driver 140 to which this control signal is inputted rotates the output shaft 50 (the output gear 52) of the motor 48 in the forward direction (one direction around the axis, the direction of arrow C) at the first speed. When the output gear 52 rotates in the one direction (the direction of arrow C) around the axis thereof, the intermediate gear 88 of the overload mechanism 86, whose external teeth 92 are meshed with the output gear 52, rotates in one direction (the direction of arrow I) around the axis thereof.

The rotation of the intermediate gear 88 is transferred to the adapter 94 via the second clutch spring 104, and the adapter 94 rotates in one direction (the direction of arrow I) around the axis thereof. Therefore, the rotor 108 of the centrifugal clutch 106, whose external teeth 114 are meshed with the external teeth 100 of the gear portion 98 of the adapter 94, is rotated in one direction (the direction of arrow K) around the axis thereof, and centrifugal force is applied to the pair of weights 124 which are supported at the rotor 108. In this case, the centrifugal force applied to the pair of weights 124 does not increase to the extent of causing the pair of weights 124 to rotate toward the radial direction outer side of the rotor 108 against the urging forces of the pair of torsion coil springs 130. Accordingly, the pair of weights 124 are held at the radial direction inner side of the rotor 108 by the urging forces of the pair of torsion coil springs 130. In this state, the pair of meshing projections 132 are apart from the ratchet 120 of the gear 116, and the rotor 108, together with the pair of weights 124, the pair of torsion coil springs 130, the sheet 134, and the cover 112, idly runs relative to the gear 116.

On the other hand, when the output gear 52 rotates in one direction (the direction of arrow C) around the axis thereof at the first speed as described above, the drive gear 56 of the meshing clutch 54, whose external teeth 60 are meshed with the output gear 52, rotates in one direction (the direction of arrow E) around the axis thereof.

Therefore, the friction spring 74 rotates the pawl 66 for forward rotation, and causes the meshing portion 72 of the pawl 66 for forward rotation to mesh with the ratchet tooth 64 of the ratchet 62. In this way, the rotation of the drive gear 56 is transferred to the ratchet 62 via the pawl 66 for forward rotation, and the ratchet 62 rotates in one direction (the direction of arrow E) around the axis thereof. The rotation of the ratchet 62 is transferred to the drum 80 via the first clutch spring 84, and the drum 80 rotates in one direction (the direction of arrow E) around the axis thereof, integrally with the first clutch spring 84 and the ratchet 62. Therefore, the barrel 38, whose external teeth 40 are meshed with the external teeth 82 of the drum 80, is rotated in the take-up direction (the direction of arrow G), and accordingly, the spool 20 is rotated in the take-up direction. Due to the rotation of the spool 20, the insufficiency of the urging force of the spiral spring 44 is compensated for, and the webbing 28 is taken-up in layers onto the spool 20 and accommodated (a so-called "take-up assisting mechanism").

Moreover, in this case, the reduction ratio of the first driving force transferring section (the output gear 52, the external teeth 60 of the drive gear 56, the external teeth 82 of the drum 80, and the external teeth 40 of the barrel 38), is set to be sufficiently lower than the reduction ratio of the second driving force transferring section (the output gear 52, the external teeth 92 of the intermediate gear 88, the external teeth 100 of the gear portion 98 of the adapter 94, the external teeth 114 of the rotor 108, the external teeth 118 of the gear 116, and the external teeth 40 of the barrel 38), and the spool 20 is rotated at a low torque. Therefore, the webbing can be safely taken-up and accommodated onto the spool 20.

Further, in the state in which the taking-up of the webbing 28 onto the spool 20 is assisted via the first driving force transferring section, if torque which is greater than or equal to the first set value is applied to the spool 20 (e.g., if a foreign object gets caught on the webbing 28), torque which is greater than or equal to the predetermined value is applied to the drum 80 of the slip mechanism 78 via the spool 20 and the barrel 38. In this case, the first clutch spring 84, which is held at the drum 80 by frictional force, runs idly (slips) relative to the drum 80, and relative rotation of the ratchet 62 with respect to the drum 80 thereby becomes possible. In this way, in the state in which the webbing 28 interferes with a foreign object, it is possible to prevent the webbing 28 from being forcibly taken-up onto the spool 20, and it is possible to prevent a very large torque from being applied to the respective parts from the ratchet 62 on (structures toward the output shaft 50, such as the pawl 66 for forward rotation, the drive gear 56, the output gear 52, and the like), and it is possible to prevent damage to these respective parts and burnout of the motor 48 and the like.

When the webbing 28 is taken-up completely onto the spool 20, the output shaft 50 (the output gear 52) of the motor 48 is rotated (rotated reversely) in the reverse direction (the direction of arrow D) by a predetermined amount (a predetermined time) by the ECU 142 and the driver 140. Therefore, the drive gear 56, whose external teeth 60 are meshed with the output gear 52, rotates in the other direction (the direction of arrow F) around the axis thereof by a predetermined amount, and the friction spring 74 causes the meshing portion 72 of the pawl 66 for forward rotation to rotate toward the side opposite the boss portion 70 of the drive gear 56. Therefore, the meshing portion 72 of the pawl 66 for forward rotation moves apart from the ratchet teeth 64 of the ratchet 62, and the state of the drive gear 56 and the ratchet 62 being connected via the pawl 66 for forward rotation is cancelled. In this way, the connection of the spool 20 and the output shaft 50 of the motor by the meshing clutch 54 is cancelled, and pulling-out again of the webbing 28 which is taken-up on the spool 20 becomes possible.

On the other hand, in the state in which the vehicle is traveling, the computing section 152 computes the distance to an obstacle in front of the vehicle on the basis of the results of detection at the infrared ray sensor 150 of the forward monitoring device 148. For example, if no obstacle exists in front of the vehicle, or if an obstacle exists but the distance from the obstacle to the vehicle is greater than or equal to a predetermined value, a low level signal is outputted from the computing section 152. In contrast, if the distance from the vehicle to an obstacle in front becomes less than the predetermined value, a high level signal is outputted from the computing section 152.

When the high level signal is inputted to the ECU 142 from the computing section 152, the ECU 142 outputs the predetermined operation signal to the driver 140. The driver 140, to which the operation signal in this state is inputted, starts the supply of electricity to the motor 48, and causes the output shaft 50 (the output gear 52) to rotate in the reverse direction (the other direction around the axis, the direction of arrow D) at the second speed.

Therefore, the drive gear 56, whose external teeth 60 are meshed with the output gear 52, rotates in the other direction (the direction of arrow F) around the axis thereof. In this case, the meshing portion 72 of the pawl 66 for forward rotation is maintained in a state of being separated from the ratchet teeth 64 of the ratchet 62 by the friction spring 74, and the state in which the connection of the drive gear 56 and the ratchet 62 is cancelled is maintained.

On the other hand, when the output gear 52 rotates at the second speed in the other direction (the direction of arrow D) around the axis thereof as described above, the intermediate gear 88 of the overload mechanism 86, whose external teeth 92 are meshed with the output gear 52, rotates in the other direction (the direction of arrow J) around the axis thereof.

The rotation of the intermediate gear 88 is transferred to the adapter 94 via the second clutch spring 104, and the adapter 94 rotates in the other direction (the direction of arrow J) around the axis thereof. Therefore, the rotor 108 of the centrifugal clutch 106, whose external teeth 114 are meshed with the external teeth 100 of the gear portion 98 of the adapter 94, is rotated in the other direction (the direction of arrow L) around the axis thereof, and centrifugal force which is greater than or equal to a predetermined value is applied to the pair of weights 124 which are supported at the rotor 108. Thus, the pair of weights 124 are rotated toward the radial direction outer side of the rotor 108 against the urging forces of the pair of torsion coil springs 130, and the meshing projections 132 provided at the pair of weights 124 mesh with the ratchet teeth 120 of the gear 116. In this way, the rotation of the rotor 108 is transferred to the gear 116 via the pair of weights 124, and the gear 116 rotates in the other direction (the direction of arrow L) around the axis thereof.

Therefore, the spool 20, whose external teeth 40 are meshed with the external teeth 118 of the gear 116, is rotated in the take-up direction (the direction of arrow G). Due to the rotation of the spool 20 in the take-up direction, the webbing 28 is taken-up onto the spool 20. In this way, the looseness or so-called "slack" of the webbing 28 is eliminated, and the force by which the webbing 28 restrains the body of the vehicle occupant improves (a so-called "pretensioner mechanism").

Further, in this state, the rotation of the output shaft 50 of the motor 48 is transferred to the spool 20 via the second driving force transferring section (the output gear 52, the external teeth 92 of the intermediate gear 88, the external teeth 100 of the gear portion 98 of the adapter 94, the external teeth 114 of the rotor 108, the external teeth 118 of the gear 116, and the external teeth 40 of the barrel 38) whose reduction ratio is higher than that of the first driving force transferring section (the output gear 52, the external teeth 60 of the drive gear 56, the external teeth 82 of the drum 80, and the external teeth 40 of the barrel 38). Therefore, the spool 20 is rotated in the take-up direction at a high torque. Accordingly, for example, when the webbing 28 is taken-up on the spool 20, even if the vehicle rapidly decelerates (rapidly brakes) and the vehicle occupant therefore starts to move toward the front of the vehicle, the webbing 28 can be forcibly taken-up against this inertial force of the vehicle occupant.

Moreover, in the state in which the webbing 28 is taken-up on the spool 20 via the second driving force transferring section, at a time when torque which is greater than or equal to the second set value is applied to the spool 20 (e.g., at a time when the so-called "slack" is eliminated and the body of the vehicle occupant becomes an obstruction and the webbing 28 can basically not be taken-up any further, or the like), due to the second clutch spring 104, which is held by frictional force with respect to the holding portion 102 of the adapter 94, idly running (slipping) relative to the adapter 94, the transfer of rotation between the adapter 94 and the intermediate gear 88 (the output gear 52) is cut-off, and the both idly run relatively. In this way, the spool 20, which is connected to the adapter 94 via the rotor 108, the pair of weights 124, and the gear 116, can be prevented from being rotated in the take-up direction by a force greater than needed by the driving force of the motor 48, and the webbing 28 can be prevented from tightly binding the body of the vehicle occupant by a force greater than needed.

When the webbing 28 is completely taken-up on the spool 20, the output shaft 50 (the output gear 52) of the motor 48 is stopped by the ECU 142 and the driver 140. Therefore, the rotation of the intermediate gear 88, the second clutch spring 104, the adapter 94, and the rotor 108 is stopped, and the centrifugal force applied to the pair of weights 124 disappears. In this way, the pair of weights 124 are rotated toward the radial direction inner side of the rotor 108 by the urging forces of the pair of torsion coil springs 130, and the meshed-together state of the pair of meshing projections 132 and the ratchet teeth 120 of the gear 116 is cancelled. Therefore, relative idle running between the rotor 108 and the gear 116 becomes possible, and the connection of the spool 20 and the output shaft 50 of the motor by the centrifugal clutch 106 is cancelled. However, in this state, rotation of the spool 20 in the pull-out direction is impeded by the unillustrated lock mechanism provided within the case 22, and pulling-out of the webbing 28 is impeded.

Here, in the motorized retractor 10 relating to the present first embodiment, as described above, due to the ECU 142 and the driver 140 switching the speed of rotation of the output shaft 50 of the motor 48 to the first speed or the second speed, the transfer path of rotational force from the motor 48 to the spool 20 is switched to the first driving force transferring section (the path through the meshing clutch 54 and the slip mechanism 78) or the second driving force transferring section (the path through the overload mechanism 86 and the centrifugal clutch 106). Accordingly, a complex switching mechanism including a solenoid, which is employed in conventional motorized retractors, is not needed, and the device can thereby be made more compact.

As described above, in accordance with the motorized retractor 10 relating to the present first embodiment, both of the mutually contradictory performances required of a take-up assisting mechanism and a pretensioner mechanism can be achieved by the single motor 48, and no switching mechanism is required so that the device can be made more compact.

Second Embodiment

A second embodiment of the present invention will be described next. Note that structures and operations which are basically the same as those of the above-described first embodiment are denoted by the same reference numerals as in the first embodiment, and description thereof is omitted.

Figure 9:
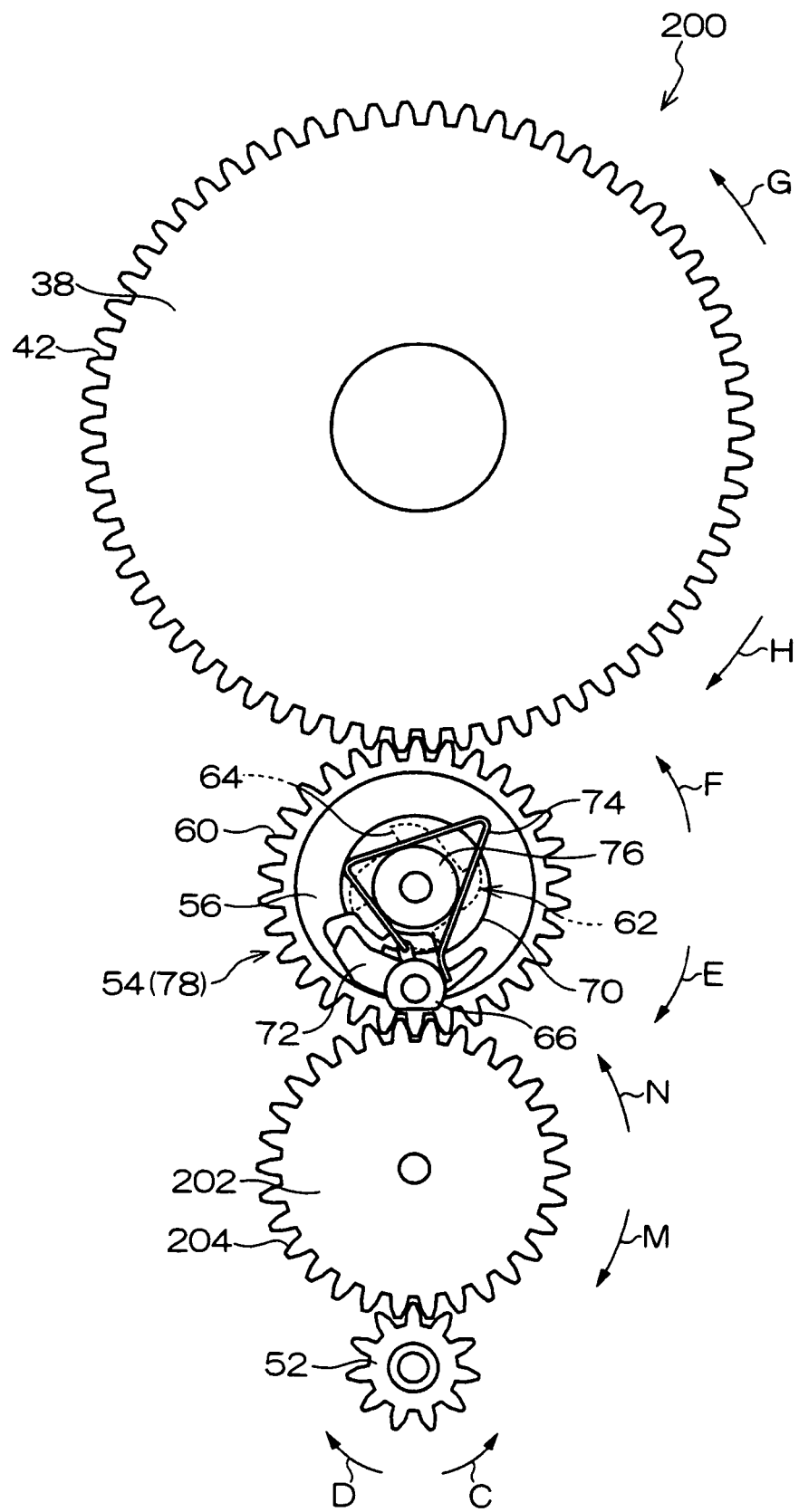
FIG. 9 is a development showing the structure of a first driving force transferring section of a motorized retractor relating to a second embodiment of the present invention.

The structure of a first driving force transferring section of a motorized retractor 200 relating to a second embodiment of the present invention is shown in a development in FIG. 9.

The motorized retractor 200 has a structure which is basically similar to that of the motorized retractor 10 relating the above-described first embodiment, but a gear 202 is provided between the drive gear 56 and the output gear 52 which structure the first driving force transferring section. Flat-toothed external teeth 204 formed at the outer periphery of the gear 202 mesh with the external teeth 60 of the drive gear 56 and with the output gear 52.

Therefore, at the motorized retractor 200, when the output shaft 50 (the output gear 52) of the motor 48 rotates forward (rotates in the direction of arrow C), the gear 202 is rotated in one direction (the direction of arrow M) around the axis thereof, and the drive gear 56 is rotated in the other direction (the direction of arrow F) around the axis thereof. In this case, as described above, the connected state of the drive gear 56 and the ratchet 62 by the pawl 66 for forward rotation remains cancelled, and the drive gear 56 and the ratchet 62 idly run relatively.

On the other hand, when the output shaft 50 (the output gear 52) of the motor 48 rotates reversely (rotates in the direction of arrow D), the gear 202 is rotated in the other direction (the direction of arrow N) around the axis thereof, and the drive gear 56 is rotated in one direction (the direction of arrow E) around the axis thereof. In this case, as described above, the drive gear 56 and the ratchet 62 are connected by the pawl 66 for forward rotation, and the meshing clutch 54 is set in a connected state.

Here, in the motorized retractor 200, when the output shaft 50 (the output gear 52) of the motor 48 is rotated reversely (rotated in the direction of arrow D) at the first speed, as described above, due to the meshing clutch 54 of the first driving force transferring section being set in a connected state, the rotation of the output shaft 50 is transferred to the spool 20 via the meshing clutch 54, the slip mechanism 78, and the barrel 38, and the spool 20 is rotated in the take-up direction (the direction of arrow G).

In contrast, when the output shaft 50 (the output gear 52) of the motor 48 is rotated reversely (rotated in the direction of arrow D) at the second speed, the centrifugal clutch 106 of the second driving force transferring section is set in the connected state, and the rotation of the output shaft 50 is transferred to the spool 20 via the second driving force transferring section (the overload mechanism 86 and the centrifugal clutch 106). In this case, the meshing clutch 54 of the first driving force transferring section as well is set in the connected state. However, due to the first clutch spring 84 of the slip mechanism 78 idly running (slipping) relative to the drum 80, the transfer of rotational force from the motor 48 to the spool 20 via the first driving force transferring section is cut-off.

Namely, in the motorized retractor 200, the output shaft 50 (the output gear 52) of the motor 48 is always rotated in one direction (the direction of arrow D) by the ECU 142. However, due to the ECU 142 switching the speed of rotation of the output shaft 50 to the first speed or the second speed, the transfer path of the rotational force from the motor 48 to the spool 20 is switched to the first driving force transferring section or the second driving force transferring section. Accordingly, control of the driving of the motor 48 by the ECU 142 can be made to be simple.

Note that, instead of the slip mechanism 78, a structure can be used which employs a clutch which maintains the connected state of the output shaft 50 and the spool 20 until the speed of rotation of the output shaft 50 reaches the second speed, and cancels the connected state of the output shaft 50 and the spool 20 at the time when the speed of rotation of the output shaft 50 becomes the second speed. In this case as well, operation and effects which are basically similar to those of the motor retractor 200 relating to the present second embodiment are exhibited.

Third Embodiment

A third embodiment of the present invention will be described next. Note that structures and operations which are basically the same as those of the above-described first embodiment are denoted by the same reference numerals as in the first embodiment, and description thereof is omitted.

Figure 10:
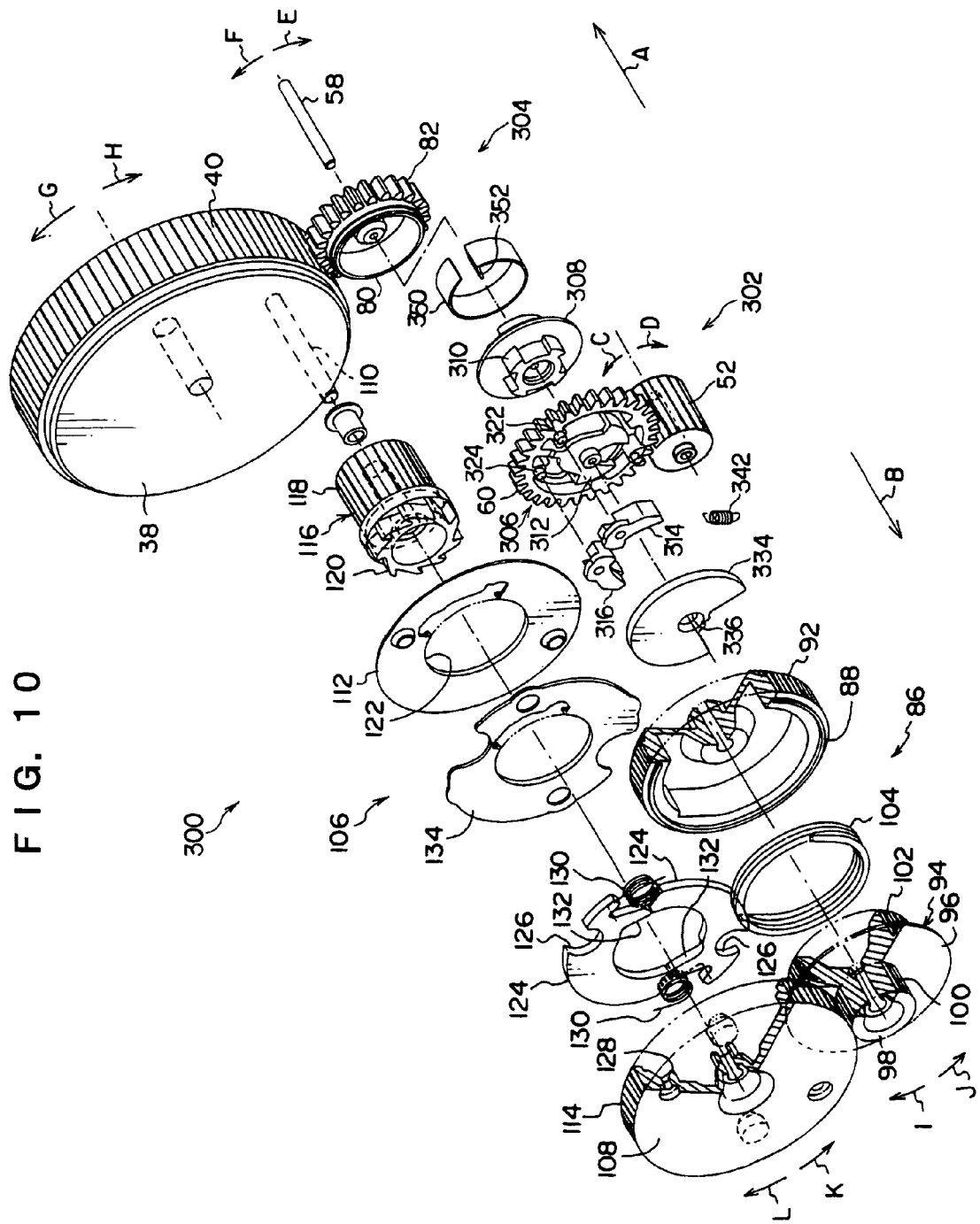
FIG. 10 is an exploded perspective view showing the structures of main portions of a motorized retractor relating to a third embodiment of the present invention.

The structures of a first driving force transferring section and a second driving force transferring section of a motorized retractor 300 relating to a third embodiment of the present invention are shown in an exploded perspective view in FIG. 10. Further, the structure of the first driving force transferring section of the motorized retractor 300 is shown in a sectional view in FIG. 11.

The motorized retractor 300 is structured basically similarly to the motorized retractor 10 relating to the above-described first embodiment. However, instead of the meshing clutch 54 and the slip mechanism 78 relating to the first embodiment, the motorized retractor 300 has a meshing clutch 302 and a slip mechanism 304 which structure the first driving force transferring section.

Figure 12:
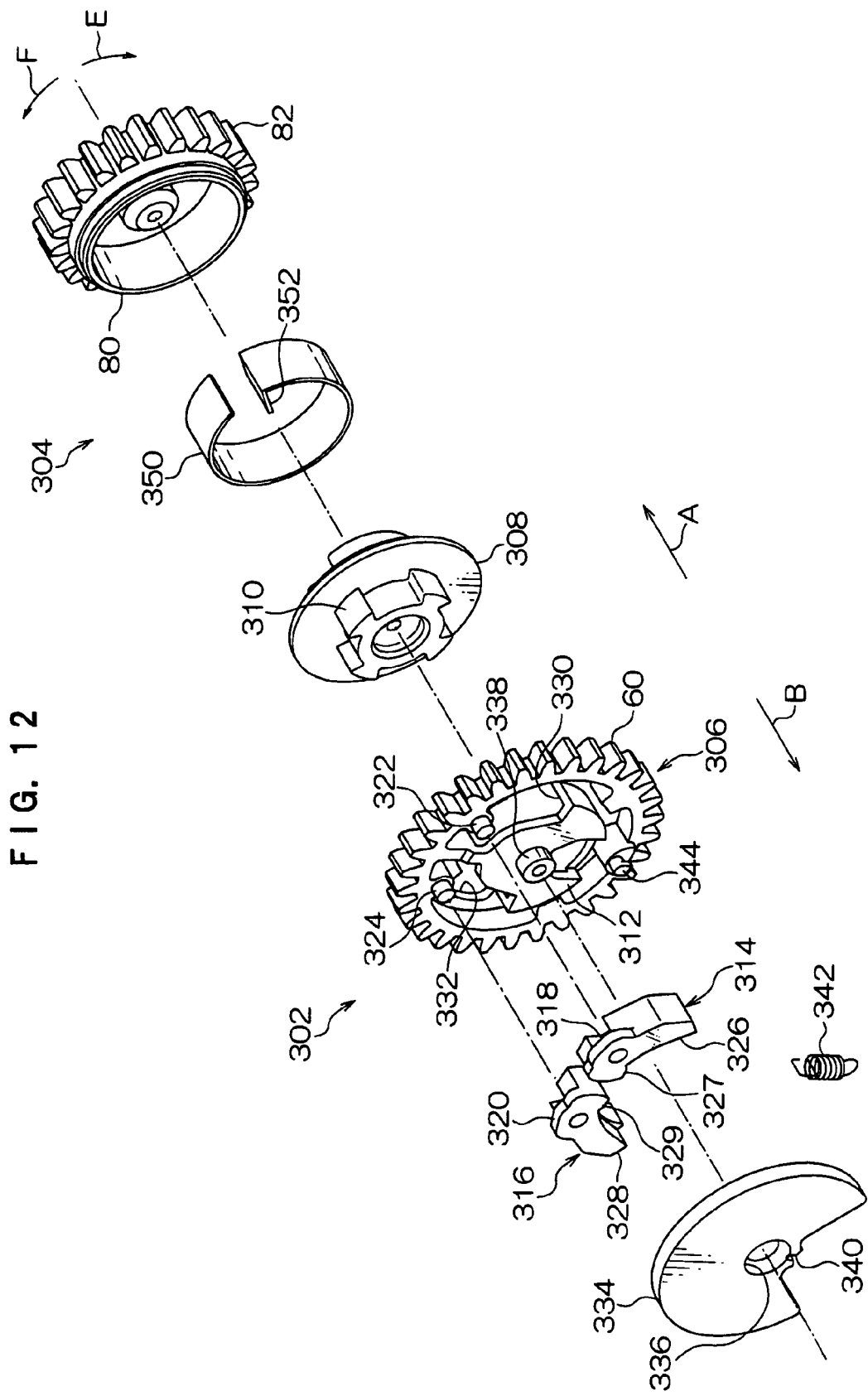
FIG. 12 is an exploded perspective view showing the structures of a meshing clutch and a slip mechanism of the motorized retractor relating to the third embodiment of the present invention.
Figure 13:
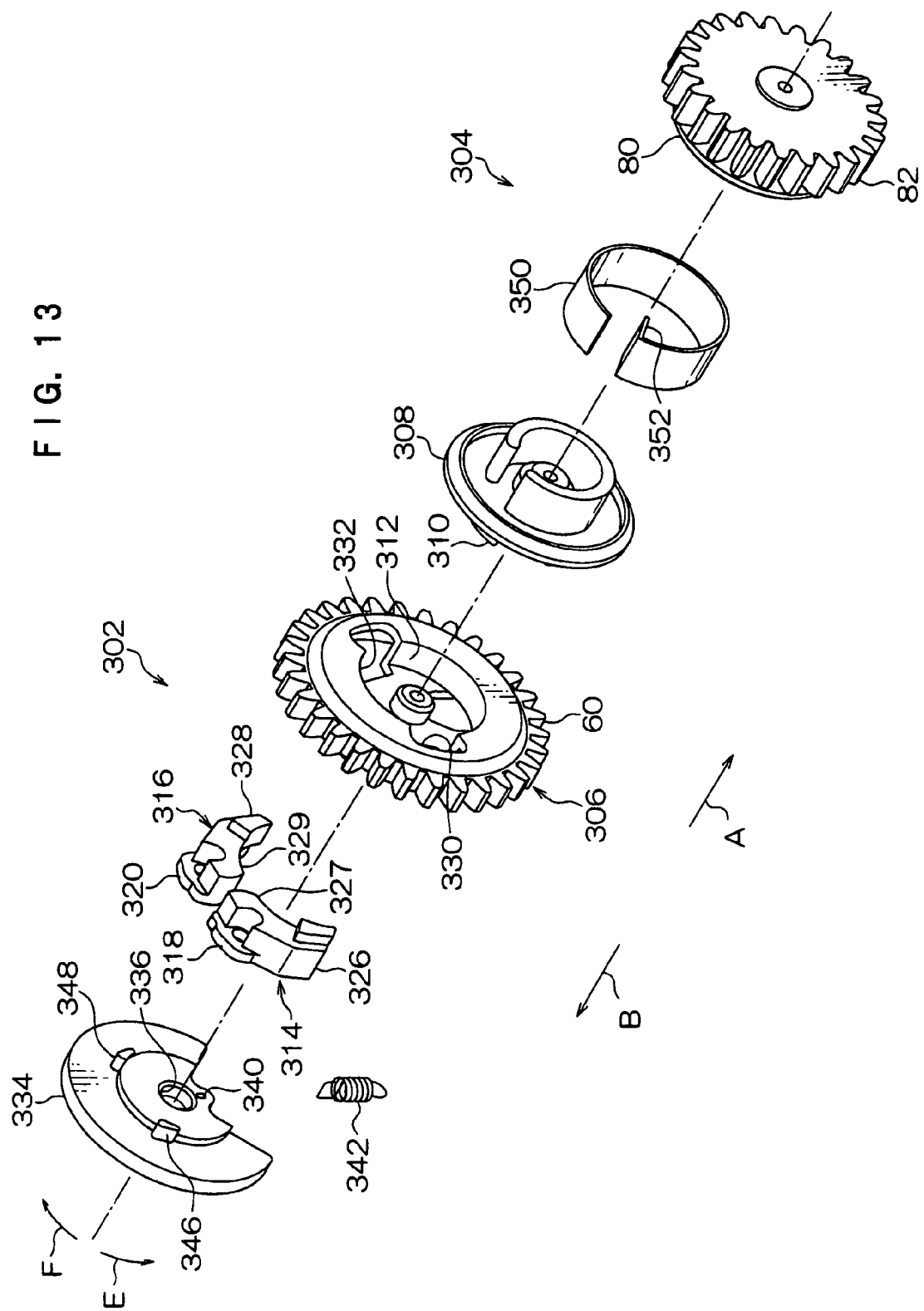
FIG. 13 is an exploded perspective view showing the structures of the meshing clutch and the slip mechanism of the motorized retractor relating to the third embodiment of the present invention.

As shown in FIGS. 12 and 13, the meshing clutch 302 has a drive gear 306. The drive gear 306 is supported at the case 32 so as to rotate freely due to the supporting shaft 58, which is mounted to the case 32, passing through the axially central portion of the drive gear 306. The flat-toothed external teeth 60 are formed at the outer peripheral portion of the drive gear 306, and these external teeth 60 mesh with the aforementioned output gear 52. Therefore, when the output gear 52 rotates in one direction (the direction of arrow C in FIG. 10) around the axis thereof (i.e., when the output shaft 50 of the motor 48 rotates forward), the drive gear 306 rotates in one direction (the direction of arrow E in FIG. 10) around the axis thereof. When the output gear 52 rotates in the other direction (the direction of arrow D in FIG. 10) around the axis thereof (i.e., when the output shaft 50 of the motor 48 rotates reversely), the drive gear 306 rotates in the other direction (the direction of arrow F in FIG. 10) around the axis thereof.

A ratchet 308, which is formed in the shape of a disc and structures the meshing clutch 302, is provided at one axial direction side (the arrow A direction side in FIGS. 12 and 13) of the drive gear 306. Due to the supporting shaft 58 passing through the axially central portion of the ratchet 308, the ratchet 308 is supported at the case 32 so as to rotate freely, and can rotate relative to the drive gear 306. External teeth 310 are formed at the drive gear 306 side of the ratchet 308. The external teeth 310 are disposed at the inner side of a boss portion 312 which is formed at the axially central portion of the drive gear 306 and is formed in the shape of a cylindrical tube having a floor.

A pawl 314 for forward rotation and a pawl 316 for reverse rotation, which structure the meshing clutch 302, are provided at the axial direction other side (the arrow B direction side in FIGS. 12 and 13) of the drive gear 306. The pawl 314 for forward rotation and the pawl 316 for reverse rotation have a main body portion 318 and a main body portion 320, respectively. These main body portions 318, 320 are rotatably supported respectively at a supporting shaft 322 and a supporting shaft 324 which project at the axial direction other end portion of the drive gear 306. Further, the pawl 314 for forward rotation has a meshing portion 326 which extends from the main body portion 318 toward a peripheral direction one side (the arrow E direction side in FIGS. 12 and 13) of the drive gear 306. The pawl 316 for reverse rotation has a meshing portion 328 which extends from the main body portion 320 toward the peripheral direction other side (the arrow F direction side in FIGS. 12 and 13) of the drive gear 306. Moreover, the pawl 314 for forward rotation has a driven portion 327 which extends from the main body portion 318 toward the peripheral direction other side (the arrow F direction side in FIGS. 12 and 13) of the drive gear 306. The pawl 316 for reverse rotation has a driven portion 329 which extends from the main body portion 320 toward the peripheral direction one side (the arrow E direction side in FIGS. 12 and 13) of the drive gear 306.

The pawl 314 for forward rotation and the pawl 316 for reverse rotation are disposed so as to oppose the boss portion 312 of the drive gear 306. Due to the pawl 314 for forward rotation and the pawl 316 for reverse rotation rotating around the supporting shafts 322, 324, the meshing portions 326, 328 approach and move away from the boss portion 312. Through holes 330, 332 are formed in the side wall of the boss portion 312 at positions opposing the pawl 314 for forward rotation and the pawl 316 for reverse rotation. The meshing portion 326 of the pawl 314 for forward rotation and the meshing portion 328 of the pawl 316 for reverse rotation both engageably (meshably) oppose the external teeth 310 of the ratchet 308 which are disposed at the inner side of the boss portion 312.

A weight 334, which structures the meshing clutch 302 and serves as an inertial member, is provided at the axial direction other side (the arrow B direction side in FIGS. 12 and 13) of the drive gear 306. The weight 334 is formed in the shape of a substantially semicircular plate of a metal material, and a round hole 336 is formed at the axially central portion thereof. A solid-cylindrical supporting shaft 338, which projects out at the axially central portion of the drive gear 306, rotatably fits-together with the round hole 336. In this way, the weight 334 is supported so as to be able to rotate with respect to the drive gear 306.

Figure 14:
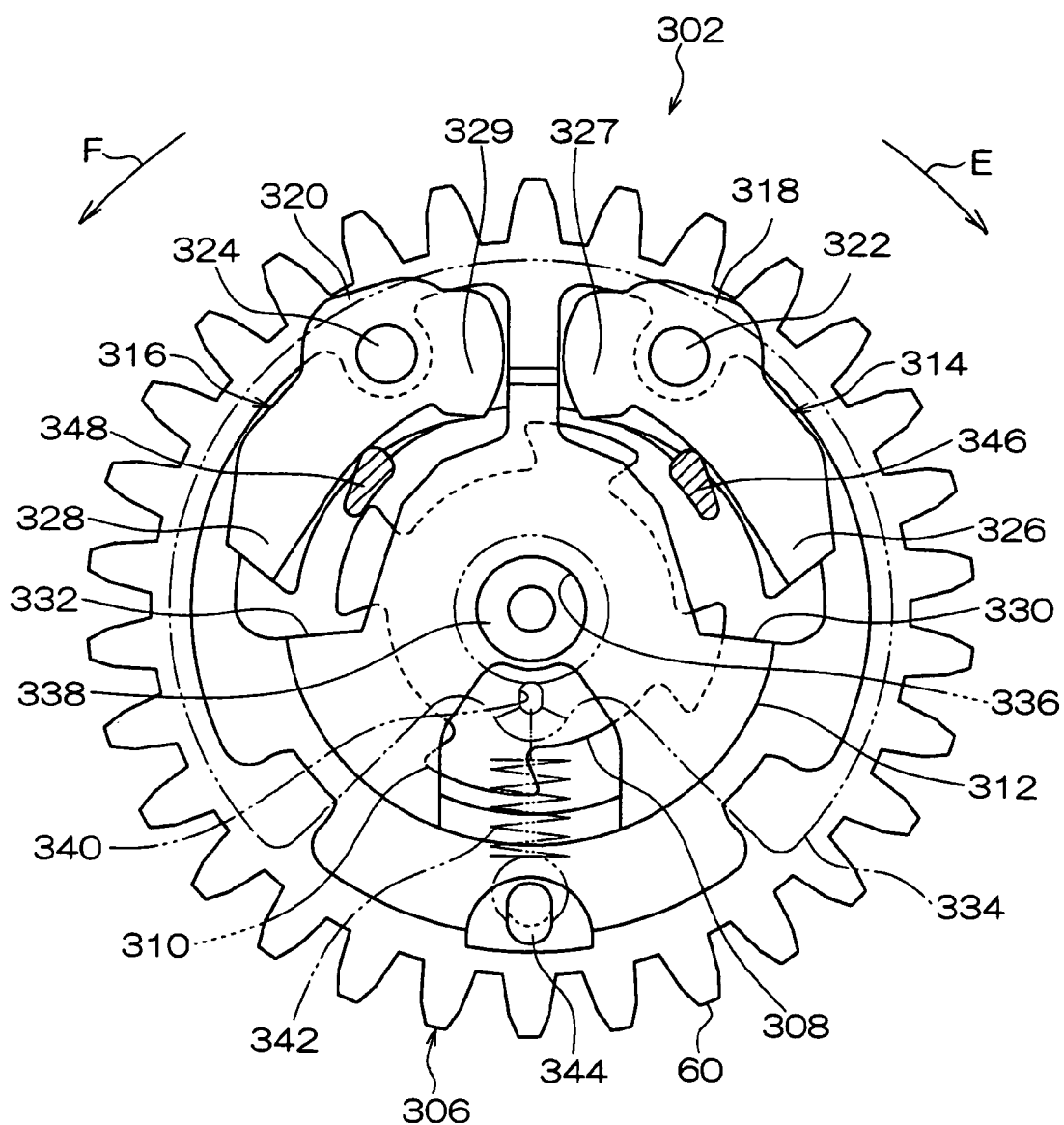
FIG. 14 is a plan view showing the structure of the meshing clutch of the motorized retractor relating to the third embodiment of the present invention, and showing a state in which an inertial member is positioned at a neutral position.

An anchor hole 340 is formed in a vicinity of the round hole 336 of the weight 334, and one end portion of a torsion coil spring 342 is anchored thereat. The other end portion of the torsion coil spring 342 is anchored at an anchor projection 344 which projects out at the drive gear 306. The weight 334 is usually held at a predetermined neutral position (the state shown in FIG. 14) with respect to the drive gear 306 by the urging force of the torsion coil spring 342.

A pair of driving projections 346, 348, which abut the pawl 314 for forward rotation and the pawl 316 for reverse rotation, project out at the drive gear 306 side end surface of the weight 334. This pair of driving projections 346, 348 are disposed in the through holes 330, 332 of the drive gear 306 respectively, and maintain the meshing portion 326 of the pawl 314 for forward rotation and the meshing portion 328 of the pawl 316 for reverse rotation, respectively, in states of being apart from the external teeth 310 of the ratchet 308.

Figure 15:
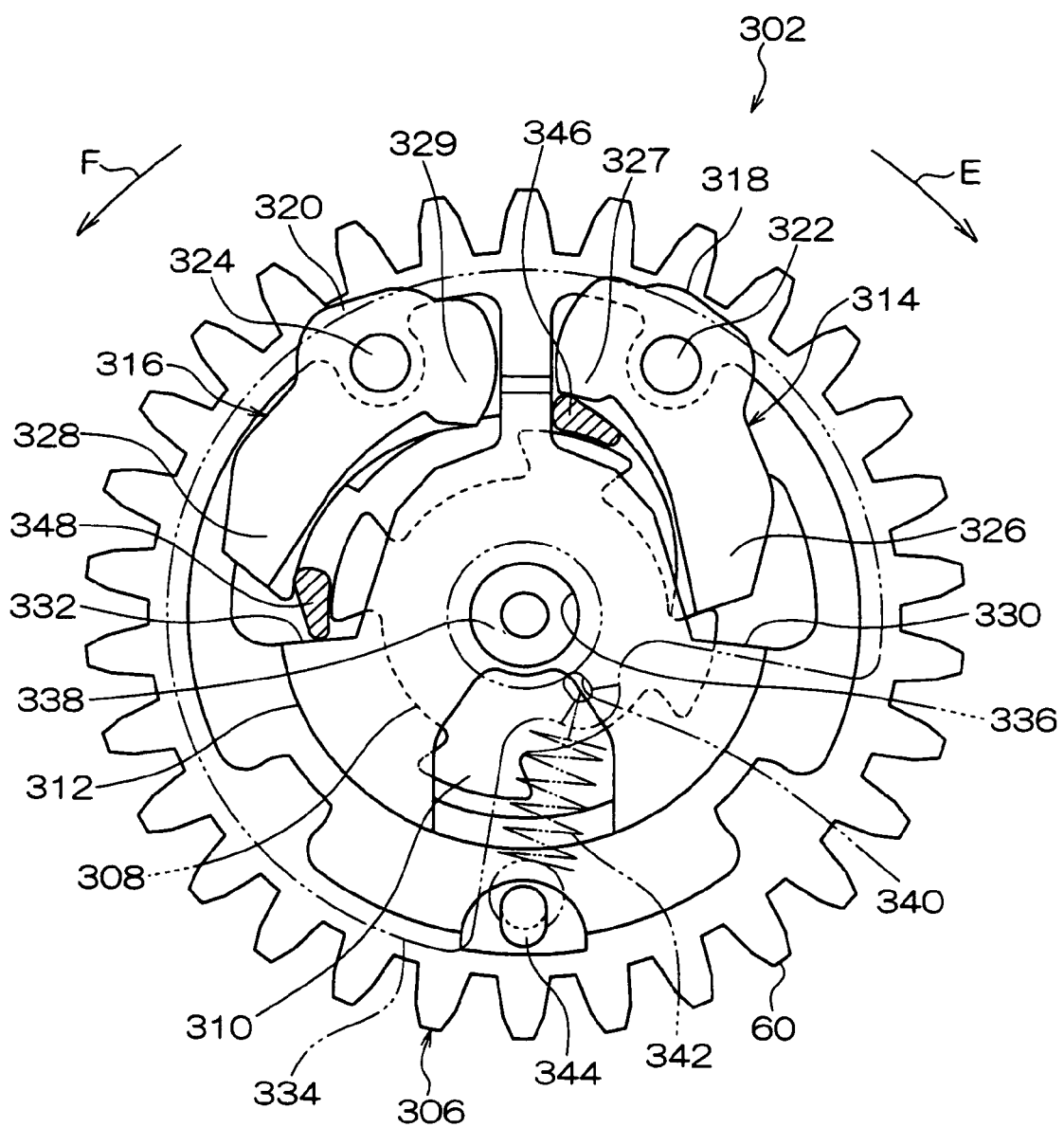
FIG. 15 is a plan view showing the structure of the meshing clutch of the motorized retractor relating to the third embodiment of the present invention, and showing a state in which a pawl for forward rotation is meshed with a ratchet by the inertial member.

Here, at the meshing clutch 302, when the drive gear 306 rotates in one direction (the direction of arrow E in FIG. 14) around the axis thereof, the weight 334 attempts to remain at that place due to inertia. Therefore, the drive gear 306 rotates by a predetermined amount in one direction (the direction of arrow E in FIG. 14) around the axis relative to the weight 334. Then, as shown in FIG. 15, when the driving projections 346, 348 abut the inner peripheral portions of the through holes 330, 332 respectively, relative rotation of the weight 334 with respect to the drive gear 306 is restricted, and, in the state in which the weight 334 is displaced with respect to the drive gear 306 from the neutral position by a predetermined amount in the other direction around the axis, the weight 334 rotates in one direction around the axis following the drive gear 306.

In this way, in the state in which the weight 334 is displaced with respect to the drive gear 306 by a predetermined amount from the neutral position in the other direction around the axis, the driving projection 346 of the weight 334 rides-up on the driven portion 327 of the pawl 314 for forward rotation. In this way, the driven portion 327 of the pawl 314 for forward rotation is moved toward the radial direction outer side of the drive gear 306, and the meshing portion 326 of the pawl 314 for forward rotation is moved toward the radial direction inner side of the drive gear 306 and meshes with the external tooth 310 of the ratchet 308. In this way, the rotation of the drive gear 306 in one direction around the axis thereof is transferred to the ratchet 308 via the pawl 314 for forward rotation, and the ratchet 308 is rotated in one direction around the axis thereof.

Further, when the drive gear 306 stops, the weight 334 is returned to its neutral position with respect to the drive gear 306 (the state shown in FIG. 14) by the urging force of the torsion coil spring 342. Therefore, the driving projection 346 of the weight 334 moves apart from the driven portion 327 of the pawl 314 for forward rotation, and causes the meshing portion 326 of the pawl 314 for forward rotation to move apart from the external teeth 310 of the ratchet 308. In this way, the transfer of rotation between the drive gear 306 and the ratchet 308 via the pawl 314 for forward rotation is cancelled.

Figure 16:
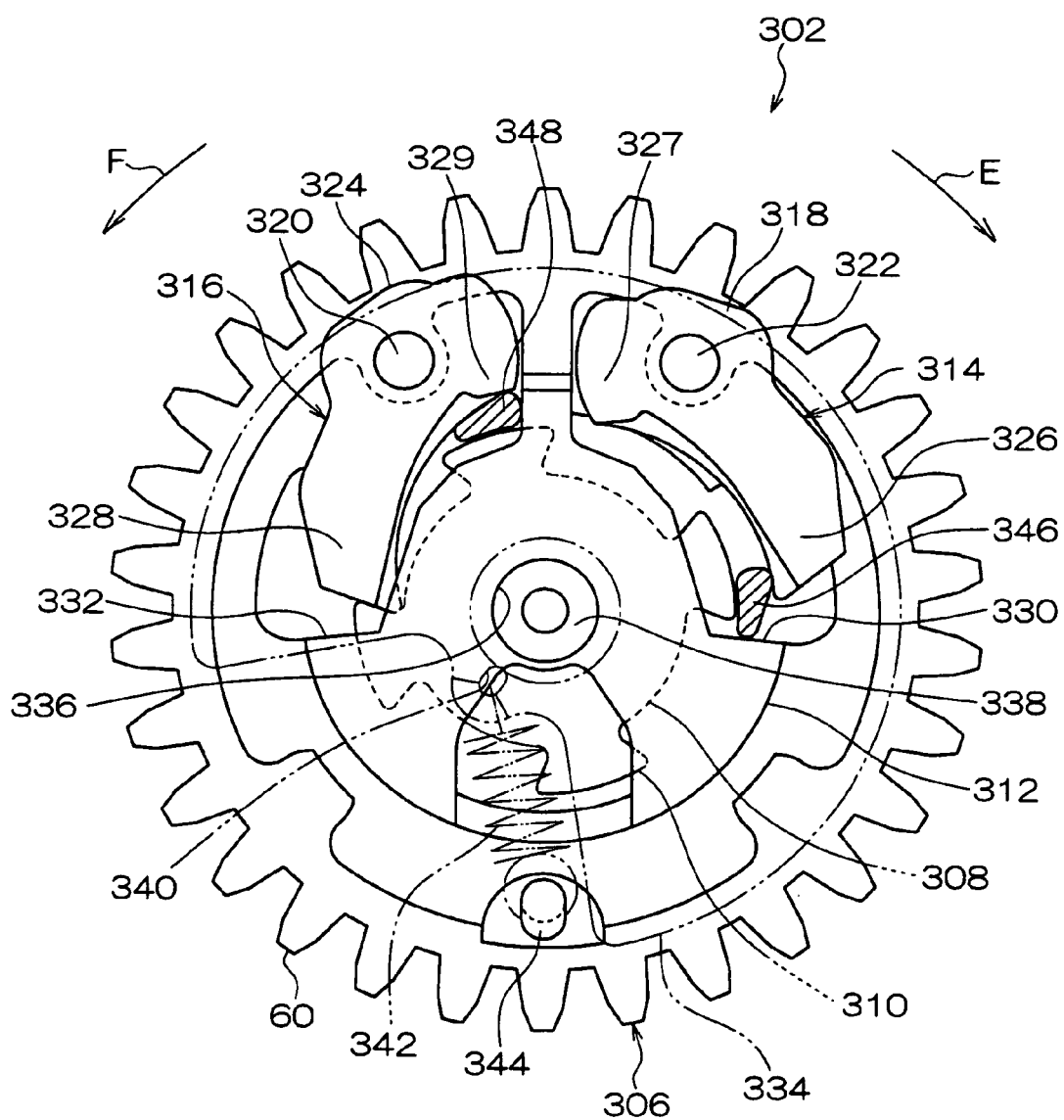
FIG. 16 is a plan view showing the structure of the meshing clutch of the motorized retractor relating to the third embodiment of the present invention, and showing a state in which a pawl for reverse rotation is meshed with the ratchet by the inertial member.

On the other hand, when the drive gear 306 rotates in the other direction (the direction of arrow F in FIG. 14) around the axis thereof, the weight 334 attempts to remain at that place due to inertia. Therefore, the drive gear 306 rotates by a predetermined amount in the other direction around the axis relative to the weight 334. Then, as shown in FIG. 16, when the driving projections 346, 348 abut the inner peripheral portions of the through holes 330, 332 respectively, relative rotation of the weight 334 with respect to the drive gear 306 is restricted, and, in the state in which the weight 334 is displaced with respect to the drive gear 306 from the neutral position by a predetermined amount in the one direction around the axis, the weight 334 rotates in the other direction around the axis following the drive gear 306.

In this way, in the state in which the weight 334 is displaced with respect to the drive gear 306 by a predetermined amount from the neutral position in the one direction around the axis, the driving projection 348 of the weight 334 rides-up on the driven portion 329 of the pawl 316 for reverse rotation. In this way, the driven portion 329 of the pawl 316 for reverse rotation is moved toward the radial direction outer side of the drive gear 306, and the meshing portion 328 of the pawl 316 for reverse rotation is moved toward the radial direction inner side of the drive gear 306 and meshes with the external tooth 310 of the ratchet 308. In this way, the rotation of the drive gear 306 in the other direction around the axis thereof is transferred to the ratchet 308 via the pawl 316 for reverse rotation, and the ratchet 308 is rotated in the other direction around the axis thereof.

Further, when the drive gear 306 stops, the weight 334 is returned to its neutral position with respect to the drive gear 306 (the state shown in FIG. 14) by the urging force of the torsion coil spring 342. Therefore, the driving projection 348 of the weight 334 moves apart from the driven portion 329 of the pawl 316 for reverse rotation, and causes the meshing portion 328 of the pawl 316 for reverse rotation to move apart from the external teeth 310 of the ratchet 308. In this way, the transfer of rotation between the drive gear 306 and the ratchet 308 via the pawl 316 for reverse rotation is cancelled.

Note that, in the state in which the weight 334 is positioned at the neutral position, the pair of driving projections 346, 348 are disposed so as to be separated by predetermined distances from the driven portion 327 of the pawl 314 for forward rotation and the driven portion 329 of the pawl 316 for reverse rotation, respectively. Even if the weight 334 rotates slightly with respect to the drive gear 306, the pawl 314 for forward rotation and the pawl 316 for reverse rotation are not rotated.

Figure 11:
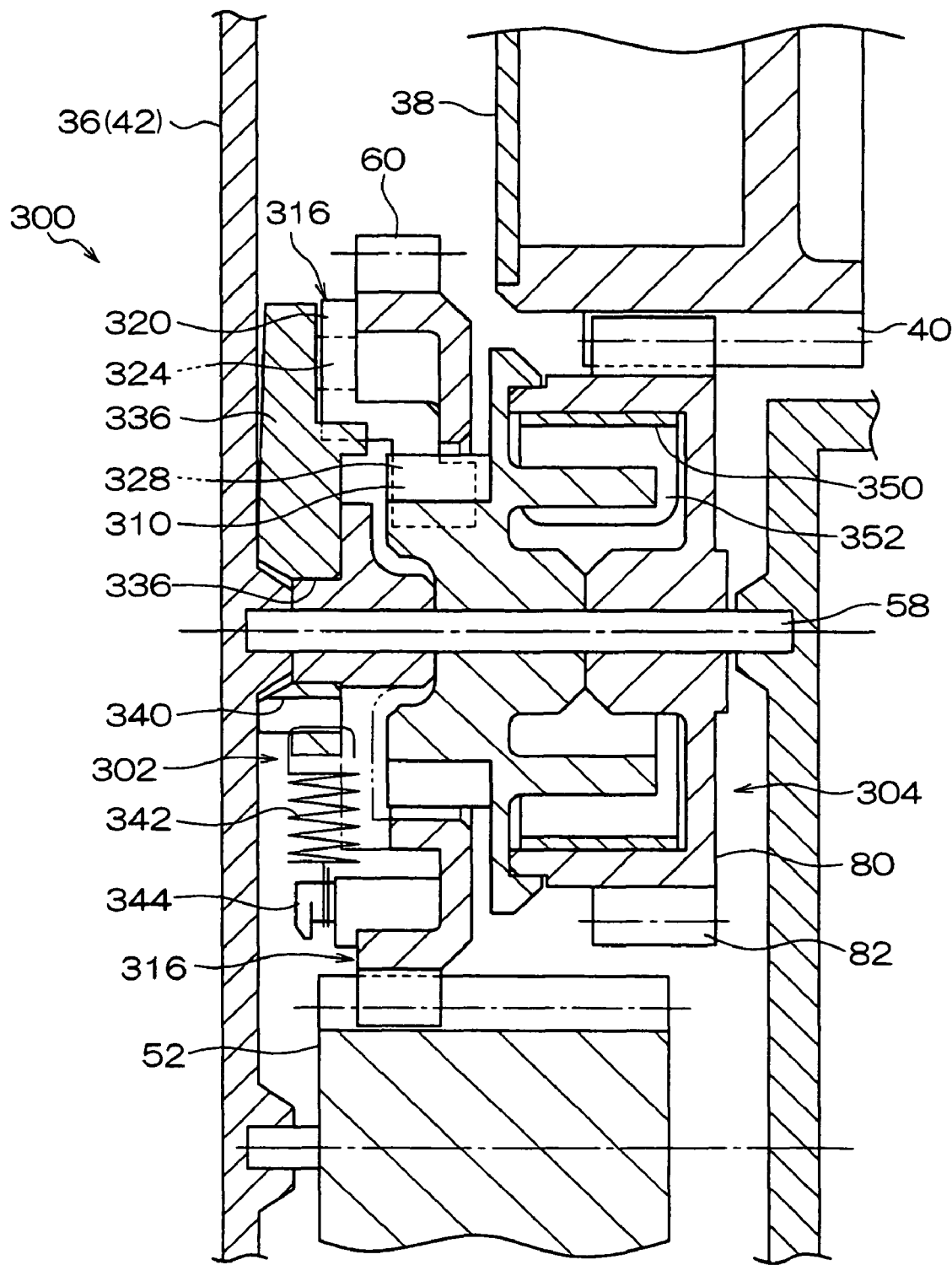
FIG. 11 is a sectional view showing the structure of a first driving force transferring section of the motorized retractor relating to the third embodiment of the present invention.

On the other hand, the drum 80, which is formed in the shape of a cylindrical tube having a floor and which structures the slip mechanism 304, is provided at the axial direction one side (the arrow A direction side in FIGS. 12 and 13) of the ratchet 308. The drum 80 has a structure which is basically similar to that of the drum 80 relating to the above-described first embodiment. As shown in FIGS. 10 and 11, the external teeth 82 formed on the outer peripheral portion of the drum 80 mesh with the external teeth 40 of the barrel 38. Therefore, when the drum 80 rotates in one direction (the direction of arrow E in FIG. 10) around the axis thereof, the barrel 38 rotates in the take-up direction (the direction of arrow G in FIG. 10). When the drum 80 rotates in the other direction (the direction of arrow F in FIG. 10) around the axis thereof, the barrel 38 rotates in the pull-out direction (the direction of arrow H in FIG. 10).

A first clutch spring 350, which serves as a first slip member structuring the slip mechanism 304, is provided at the inner side of the drum 80. The first clutch spring 350 is formed by bending a metal plate member in a substantial C shape, and has a basically similar function as the first clutch spring 84 relating to the above-described first embodiment. Namely, the outer peripheral surface of the first clutch spring 350 is fit tightly to the inner peripheral surface of the drum 80. An anchor portion 352 formed at one end portion of the first clutch spring 350 in the direction of bending thereof is anchored at the ratchet 308. In this way, the drum 80 is connected to the ratchet 308 via the first clutch spring 350, and basically rotates integrally with the ratchet 308. However, when rotational force of a predetermined value or greater is applied between the ratchet 308 and the drum 80, due to the first clutch spring 350 slipping with respect to the drum 80, the ratchet 308 and the first clutch spring 350 on the one hand, and the drum 80 on the other hand, idly run relatively.

Moreover, in the motorized retractor 300, at the time when the vehicle occupant starts to apply the webbing 28 (e.g., at the time when, in the state in which the webbing 28 is completely stored in the present motorized retractor 300, an unillustrated take-up amount sensor or the like detects rotation of the spool 20 in the pull-out direction), the ECU 142 and the driver 140 rotate the output shaft 50 of the motor 48 at the first speed in the reverse direction (the other direction around the axis, the direction of arrow D in FIG. 10). Then, when the ON signal is inputted from the buckle switch 146, the ECU 142 and the driver 140 stop the output shaft 50 of the motor 48.

Note that, in the motorized retractor 300, other structural parts are structured basically similarly to those of the motorized retractor 10 relating to the above-described first embodiment.

Operation of the present third embodiment will be described next.

In the motorized retractor 300 having the above-described structure, in the same way as in the motorized retractor 10 relating to the above-described first embodiment, when the vehicle occupant removes the tongue plate from the buckle device, the ECU 142 and the driver 140 rotate the output shaft 50 (the output gear 52) of the motor 48 at the first speed in the forward direction (one direction around the axis, the direction of arrow C in FIG. 10). When the output gear 52 rotates in the one direction around the axis thereof, the drive gear 306 of the meshing clutch 302, whose external teeth 60 are meshed with the output gear 52, rotates in one direction (in the direction of arrow E in FIG. 10) around the axis thereof.

When the drive gear 306 rotates in the one direction (the direction of arrow E in FIG. 10) around the axis thereof, the weight 334 attempts to remain at that place due to inertia. Therefore, the drive gear 306 rotates by a predetermined amount in the one direction around the axis thereof relative to the weight 334. Then, as shown in FIG. 15, when the driving projections 346, 348 abut the inner peripheral portions of the through holes 330, 332 respectively, relative rotation of the weight 334 with respect to the drive gear 306 is restricted, and, in the state in which the weight 334 is displaced with respect to the drive gear 306 by a predetermined amount from the neutral position in the other direction around the axis, the weight 334 rotates in the one direction around the axis thereof following the drive gear 306.

In this way, in the state in which the weight 334 is displaced with respect to the drive gear 306 by a predetermined amount from the neutral position in the other direction around the axis, the driving projection 346 of the weight 334 rides-up on the driven portion 327 of the pawl 314 for forward rotation. In this way, the driven portion 327 of the pawl 314 for forward rotation is moved toward the radial direction outer side of the drive gear 306, and the meshing portion 326 of the pawl 314 for forward rotation is moved toward the radial direction inner side of the drive gear 306 and meshes with the external tooth 310 of the ratchet 308. In this way, the rotation of the drive gear 306 in the one direction around the axis thereof is transferred to the ratchet 308 via the pawl 314 for forward rotation, and the ratchet 308 is rotated in the one direction (the direction of arrow E in FIG. 10) around the axis thereof.

The rotation of the ratchet 308 in the one direction around the axis thereof is transferred to the drum 80 via the first clutch spring 350. The drum 80 is rotated in one direction around the axis thereof, the barrel 38 is rotated in the take-up direction (the direction of arrow G in FIG. 10), and accordingly, the spool 20 is rotated in the take-up direction. In this way, in the same way as in the motorized retractor 10 relating to the above-described first embodiment, the webbing 28 is taken-up onto the spool 20 and accommodated (a so-called "take-up assisting mechanism").

When the webbing 28 is completely taken-up on the spool 20, the output shaft 50 (the output gear 52) of the motor 48 is stopped by the ECU 142 and the driver 140, and the drive gear 306 stops. When the drive gear 306 stops, the weight 334 is returned to its neutral position with respect to the drive gear 306 (the state shown in FIG. 14) by the urging force of the torsion coil spring 342. Therefore, the driving projection 346 of the weight 334 moves apart from the driven portion 327 of the pawl 314 for forward rotation, and causes the meshing portion 326 of the pawl 314 for forward rotation to move apart from the external teeth 310 of the ratchet 308. In this way, the connected state of the drive gear 306 and the ratchet 308 via the pawl 314 for forward rotation is cancelled, and the connection between the spool 20 and the output shaft 50 of the motor 48 by the meshing clutch 302 is cancelled. In this way, pulling-out again of the webbing 28, which is taken-up on the spool 20, becomes possible.

On the other hand, when the vehicle occupant starts to apply the webbing 28, the ECU 142 and the driver 140 rotate the output shaft 50 (the output gear 52) of the motor 48 at the first speed in the reverse direction (the other direction around the axis, the direction of arrow D in FIG. 10). When the output shaft 52 rotates in the other direction around the axis, the drive gear 306 of the meshing clutch 302, whose external teeth 60 are meshed with the output gear 52, rotates in the other direction (in the direction of arrow F in FIG. 10) around the axis thereof.

When the drive gear 306 rotates in the other direction around the axis thereof, the weight 334 attempts to remain at that place due to inertia. Therefore, the drive gear 306 rotates by a predetermined amount in the other direction around the axis thereof relative to the weight 334. Then, as shown in FIG. 16, when the driving projections 346, 348 abut the inner peripheral portions of the through holes 330, 332 respectively, relative rotation of the weight 334 with respect to the drive gear 306 is restricted, and, in the state in which the weight 334 is displaced with respect to the drive gear 306 by a predetermined amount from the neutral position in the one direction around the axis, the weight 334 rotates in the other direction around the axis thereof following the drive gear 306.

In this way, in the state in which the weight 334 is displaced with respect to the drive gear 306 by a predetermined amount from the neutral position in the one direction around the axis, the driving projection 348 of the weight 334 rides-up on the driven portion 329 of the pawl 316 for reverse rotation. In this way, the driven portion 329 of the pawl 316 for reverse rotation is moved toward the radial direction outer side of the drive gear 306, and the meshing portion 328 of the pawl 316 for reverse rotation is moved toward the radial direction inner side of the drive gear 306 and meshes with the external tooth 310 of the ratchet 308. In this way, the rotation of the drive gear 306 in the other direction around the axis thereof is transferred to the ratchet 308 via the pawl 316 for reverse rotation, and the ratchet 308 is rotated in the other direction (the direction of arrow F in FIG. 10) around the axis thereof.

The rotation of the ratchet 308 in the other direction around the axis thereof is transferred to the drum 80 via the first clutch spring 350. The drum 80 is rotated in the other direction around the axis thereof, the barrel 38 is rotated in the pull-out direction (the direction of arrow H in FIG. 10), and accordingly, the spool 20 is rotated in the pull-out direction. In this way the pulling-out of the webbing 28 by the vehicle occupant is assisted, and therefore, the vehicle occupant can pull-out the webbing 28 by a slight force (a so-called "pull-out assisting mechanism").

Then, when the vehicle occupant engages the tongue plate provided at the webbing 28 with the buckle device, the output shaft 50 of the motor 48 is stopped by the ECU 142 and the driver 140, and the drive gear 306 stops. When the drive gear 306 stops, the weight 334 is returned to its neutral position with respect to the drive gear 306 (the state shown in FIG. 14) by the urging force of the torsion coil spring 342. Therefore, the driving projection 348 of the weight 334 moves apart from the driven portion 329 of the pawl 316 for reverse rotation, and causes the meshing portion 328 of the pawl 316 for reverse rotation to move apart from the external teeth 310 of the ratchet 308. In this way, the connected state of the drive gear 306 and the ratchet 308 via the pawl 316 for reverse rotation is cancelled, and the connection of the spool 20 and the output shaft 50 of the motor 48 by the meshing clutch 302 is cancelled. Therefore, the spool 20 rotates in the take-up direction by a relatively weak rotational force corresponding to the urging force of the spiral spring 44, and the slack in the webbing 28 which is in the applied state is eliminated.

As described above, in the motorized retractor 300 relating to the present third embodiment, operation and effects which are basically similar to those of the motorized retractor 300 relating to the above-described first embodiment are exhibited. Moreover, in the motorized retractor 300, the meshing clutch 302 which structures the first driving force transferring section transfers to the spool 20 rotation in both directions which is the forward rotation and the reverse rotation of the output shaft 50 of the motor 48. Therefore, as described above, both mechanisms which are the take-up assisting mechanism and the pull-out assisting mechanism can be established. Further, because the transfer of rotation of both directions is achieved by the single meshing clutch 302 in this way, the structure of the meshing clutch 302 can be made to be simple and compact. In this way, the present motorized retractor 300 can be made to be compact, and the cost thereof can be reduced.

What is claimed is:

1. A motorized retractor comprising:
a spool on which a webbing for restraining a vehicle occupant is wound so as to be able to be taken-up thereon and pulled-out therefrom;
a motor;
a control section able to switch a speed of rotation of an output shaft of the motor to at least two levels which are a first speed and a second speed which is faster than the first speed;
a first driving force transferring section provided between the spool and the output shaft, and reducing, at a predetermined reduction ratio, rotation of the output shaft at the first speed, and transferring the rotation to the spool, and rotating the spool in a take-up direction; and
a second driving force transferring section provided between the spool and the output shaft independently of the first driving force transferring section, and reducing, at a reduction ratio which is higher than the predetermined reduction ratio of the first driving force transferring section, rotation of the output shaft at the second speed, and transferring the rotation to the spool, and rotating the spool in the take-up direction,
wherein the first driving force transferring section has a first clutch which, when the output shaft of the motor rotates at the first speed, connects the spool and the output shaft, and makes transfer of rotation between the spool and the output shaft possible, and when the output shaft of the motor rotates at the second speed, does not connect the spool and the output shaft, and does not transfer of rotation between the spool and the output shaft, and
wherein the second driving force transferring section has a second clutch which, when the output shaft of the motor rotates at the second speed, connects the spool and the output shaft, and makes transfer of rotation between the spool and the output shaft possible, and when the output shaft of the motor rotates at the first speed, does not connect the spool and the output shaft, and does not make transfer of rotation between the spool and the output shaft possible, and
wherein the first driving force transferring section has: a first idle running mechanism which, when torque which is greater than or equal to a first set value is applied to the spool in a connecting state of the first clutch, cuts-off the transfer of rotation between the spool and the output shaft by the torque, and makes the spool and the output shaft able to idly run relatively, and
wherein the first clutch is a meshing clutch having a pawl for forward rotation which rotates by rotation of the output shaft being transferred thereto, and when the output shaft rotates forward, the pawl for forward rotation transfers forward rotation of the output shaft to the spool by meshing one of directly and indirectly with the spool, and when the output shaft is stopped or rotates reversely, a meshed state of the pawl for forward rotation is cancelled; and
the first idle running mechanism is a slip mechanism having a first slip member which rotates by rotation of the output shaft being transferred thereto, the first slip member being connected one of directly and indirectly to the spool by frictional force and making the spool able to rotate, and when torque which is greater than or equal to the first set value is applied to the spool, the first slip member slips with respect to the spool against the frictional force, and
wherein the meshing clutch has:
a drive gear connected to the output shaft of the motor, and rotating by rotation of the output shaft being transferred thereto, and rotatably supporting the pawl for forward rotation;
a ratchet supported so as to rotate freely with respect to the drive gear, and connected to the first slip member; and
a friction spring engaging one of directly and indirectly with a frame which supports the spool, the friction spring being connected to the pawl, the friction spring being structured to cause the pawl for forward rotation to mesh with the ratchet when the drive gear rotates in one direction as the output shaft rotates forward, and the friction spring being structured to cause the pawl for forward rotation to separate from the ratchet when the drive gear one of stops and rotates in another direction as the output shaft one of stops and rotates reversely, and
the slip mechanism has a drum which is supported so as to rotate with respect to the ratchet and is connected to the spool, the drum making the spool able to rotate, and holding the first slip member by the frictional force.

2. The motorized retractor of claim 1, wherein the second clutch is a centrifugal clutch having a weight which rotates by rotation of the output shaft being transferred thereto, and when the output shaft is rotating at greater than or equal to the second speed, the weight is moved due to centrifugal force applied thereto and engages one of directly and indirectly with the spool and connects the output shaft and the spool, and when the output shaft is one of stopped and rotating at less than the second speed, an engaged state of the weight with the spool is cancelled.

3. The motorized retractor of claim 1, wherein the second driving force transferring section has a second idle running mechanism which, when torque which is greater than or equal to a second set value is applied to the spool in a state in which rotation of the output shaft is being transferred to the spool, cuts-off transfer of rotation between the spool and the output shaft by the torque, and makes the spool and the output shaft able to idly run relatively.

4. The motorized retractor of claim 3, wherein the second idle running mechanism is an overload mechanism having a second slip member which rotates by rotation of the output shaft being transferred thereto, and which is connected one of directly and indirectly with respect to the spool by frictional force, and which makes the spool able to rotate, and when torque which is greater than or equal to the second set value is applied to the spool, the second slip member slips with respect to the spool against the frictional force.

5. The motorized retractor of claim 1, wherein a gear is provided between the drive gear and the output shaft of the motor such that rotating of the output shaft is transferred to the drive gear.

* * * * *